US006094601A

United States Patent [19]

Popovich

[11] Patent Number: 6,094,601

[45] Date of Patent: Jul. 25, 2000

[54] ADAPTIVE CONTROL SYSTEM WITH EFFICIENTLY CONSTRAINED ADAPTATION

[75] Inventor: Steven R. Popovich, Stoughton, Wis.

[73] Assignee: Digisonix, Inc., Madison, Wis.

[21] Appl. No.: 08/941,828

[22] Filed: Oct. 1, 1997

[51] Int. Cl.[7] .......... G05B 13/02

[52] U.S. Cl. .......... 700/28; 700/45

[58] Field of Search .......... 700/28, 29, 30, 700/33, 45, 44, 46, 55

[56] References Cited

U.S. PATENT DOCUMENTS

| | | | |
|---|---|---|---|
| 4,677,676 | 6/1987 | Eriksson | 381/71.11 |
| 4,950,966 | 8/1990 | Moulds, III | 318/561 |
| 5,049,795 | 9/1991 | Moulds, III | 318/561 |
| 5,140,640 | 8/1992 | Graupe et al. | 381/71.12 |
| 5,164,647 | 11/1992 | Moulds, III | 318/561 |
| 5,170,433 | 12/1992 | Elliott et al. | 704/226 |
| 5,233,540 | 8/1993 | Andersson et al. | 700/280 |
| 5,278,913 | 1/1994 | Delfosse et al. | 381/71.11 |
| 5,365,594 | 11/1994 | Ross et al. | 381/71.44 |
| 5,404,409 | 4/1995 | Nagami et al. | 381/71.8 |
| 5,440,641 | 8/1995 | Kuusama | 381/71.12 |
| 5,457,625 | 1/1995 | Lim et al. | 700/29 |
| 5,548,192 | 8/1996 | Hanks | 318/560 |
| 5,561,598 | 10/1996 | Nowak et al. | 700/55 |
| 5,574,638 | 11/1996 | Lu | 700/45 |
| 5,587,896 | 12/1996 | Hansen et al. | 700/28 |
| 5,621,803 | 4/1997 | Laak | 381/71.11 |
| 5,627,896 | 5/1997 | Southward et al. | 381/71.11 |
| 5,633,795 | 5/1997 | Popovich | 700/28 |
| 5,691,893 | 11/1997 | Stothers | 700/28 |
| 5,708,581 | 1/1998 | Martinez | 710/52 |
| 5,710,822 | 1/1998 | Steenhagen et al. | 381/71.12 |
| 5,831,850 | 11/1998 | Chebre et al. | 700/38 |
| 5,909,370 | 6/1999 | Lynch | 700/50 |
| 5,912,821 | 6/1999 | Kobayashi | 700/280 |

FOREIGN PATENT DOCUMENTS

| | | |
|---|---|---|
| 0492680 | 1/1992 | European Pat. Off. . |
| 0759606 | 2/1997 | European Pat. Off. . |
| WO 94/24662 | 10/1994 | WIPO . |
| WO 94/29846 | 12/1994 | WIPO . |

OTHER PUBLICATIONS

"High–Speed Synchronized Filtered–X Algorithm Using Single–Frequency Adaptive Notch Filter", K. Ito et al.; Yokohama, Japan, Aug. 29–31, 1994, pp. 1237–1240.

"An Adaptive Modal–Based Active Control System", Dennis R. Morgan, J. Acoust. Soc. Am. 89(1), Jan., 1991, pp. 248–256.

"Frequency Selective Active Adaptive Control System", Steenhagen et al., U.S. Patent Application Serial No. 08/553, 186.

*Primary Examiner*—William Grant
*Assistant Examiner*—Chad Rapp
*Attorney, Agent, or Firm*—Andrus, Sceales, Starke & Sawall

[57] ABSTRACT

An adaptive control system implements a back-projection technique to limit adaptation of adaptive parameters in the system so that system actuators are not driven beyond desired physical limitations. When the optimal controller solution lies outside of a desired region in the parameter space, chosen in accordance with the physical limitations of the system, adaptation is back-projected onto or near a smooth convex surface defining the edge of the desired region. Adaptation is preferably normalized to improve adaptation convergence. Back-projection is preferably compensated in accordance with adaptation normalization to facilitate convergence. To lessen computational burdens, adaptation and/or back-projection is accomplished in accordance with a time-sharing technique in which orthogonal components are separately processed. The technique can be implemented in tonal control systems, and in systems capable of controlling non-periodic disturbances.

63 Claims, 15 Drawing Sheets

ADAPTIVE CONTROL SYSTEM WITH EFFICIENTLY CONSTRAINED ADAPTATION

FIELD OF THE INVENTION

The invention relates generally to adaptive control systems and methods, and more particularly, to active acoustic attenuation systems where constraint of adaptive parameters defining controller output is desired.

BACKGROUND OF THE INVENTION

The present invention was developed during ongoing research and developmental efforts by the assignee to improve performance of adaptive control systems. An example of an active acoustic control system developed by the assignee which is capable of attenuating non-periodic acoustic disturbances is disclosed in U.S. Pat. No. 5,621,803 entitled "Active Attenuation System With On-Line Modeling of Feedback Path", by Trevor A. Laak, issued on Apr. 15, 1997, assigned to the assignee of the present application, incorporated by reference herein. In many active control applications, cancellation is required only at discrete frequencies where tonal disturbances exist. An example of an adaptive tonal control systems and methods developed by the assignee is disclosed in copending U.S. patent application Ser. No. 08/369,925 entitled "Adaptive Tonal Control System With Constrained Output and Adaptation", by Steven R. Popovich, filed on Jan. 6, 1995, now U.S. Pat. No. 5,633,795, issued on May 27, 1997 which is incorporated by reference herein.

Problems can sometimes develop in adaptive control systems when the controller attempts to drive one or more of the actuators (i.e., loudspeakers in a sound attenuation system) beyond physically sustainable limits. For low or medium actuator output, the transfer function for actuators is characteristically linear. However, when actuator output becomes high, the actuator transfer function becomes non-linear and the system can become unstable and/or physical components of the system can be damaged. It is therefore desirable to constrain controller output so that the maximum output of each actuator is limited within the linear range of each individual actuator. One way of constraining controller output involves the use of leakage methods, but leakage methods can compromise overall system performance when used for the purpose of limiting output power. Examples of power limiting using leakage techniques include the system disclosed in copending patent application Ser. No. 08/553,186 entitled "Frequency Selective Active Adaptive Control System", by Shawn K. Steenhagen et al., filed on Nov. 7, 1995, assigned to the assignee of the present application, now U.S. Pat. No. 5,710,822; and U.S. Pat. No. 5,627,896 entitled "Active Control of Noise and Vibration", by Steve C. Southward et al., issued on May 6, 1997.

In many active control applications, it is necessary to use multiple inputs and multiple outputs to attain effective control. The use of high numbers of sensors and actuators along with sophisticated adaptation schemes can stretch computational requirements beyond those practical. It is therefore not only important that adaptation converge reliably to an adequate solution, but also that adaptation occurs efficiently within realistic signal processing requirements.

The filtered-X algorithm is an effective means for controlling disturbances at multiple locations when there are a relatively small number of sensors and actuators. However, as the number of actuators and error signals becomes large, convergence rates tend to slow. Normalizing adaptation to provide more direct convergence improves tracking in tonal systems, and also benefits performance in feedforward systems cancelling random disturbances.

It is desirable to provide normalized adaptation for quick convergence while at the same time limiting individual actuator output so that the effectiveness of each individual actuator is maximized, all without exceeding reasonable signal processing resources provided by conventional digital signal processors used for active acoustic attenuation. It is also important for the limiting of the actuator outputs to be performed in a manner which is compatible with the normalization of the adaptation so that these functions may be performed simultaneously.

SUMMARY OF THE INVENTION

The invention is an adaptive control system and method that effectively constrains adaptation so that system actuators are not driven beyond one or more selected physical limits. Adaptation is constrained by defining a constraint surface in the parameter space of the adaptive parameters, and directly constraining adaptation when unconstrained adaptation would cause one or more of the adaptive parameters to lie substantially outside of the desired region of adaptation contained within the constraint surface.

The invention is preferably implemented using a parameter back-projection technique to constrain adaptation of the adaptive parameters (e.g. FIR filter tap weights in a broadband system, or scaling vectors in a tonal system) when unconstrained adaptation would cause one or more of the adaptive parameters to lie substantially outside of the constraint surface. The back-projection technique is especially effective because it allows adaptation to migrate along the constraint surface until an optimum solution within or substantially near the constraint surface. It is normally preferred that adaptation be normalized to improve the rate of convergence. When using normalized adaptation, back-projection should be compensated to account for adaptation normalization and to ensure that continued back-projected adaptation seeks the optimum solution for constrained adaptation.

In order to simplify the back-projection procedure and ensure proper convergence of the constrained adaptation, it is desired that the constraint surface be defined a smooth convex surface. If adaptation step size and transformations to compensate for normalized adaptation are chosen properly, the constraint surface can be approximated by a plane that is tangent to the smooth convex surface. Back-projection can then be accomplished to the tangent plane approximating the constraint surface rather than the constraint surface itself. Over time, the position and orientation of the plane changes as constrained adaptation causes the adaptive parameter values to migrate along the constraint surface. In addition, it may be desirable to globally scale the adaptive parameters or otherwise account for differences between the tangent plane and the constraint surface caused by curvature of the constraint surface.

In most applications, it is preferred that the constraint surface be a pre-selected, fixed surface in the parameter space for the adaptive parameters. However, if reference signal statistics for the acoustic disturbance being attenuated or controlled are non-stationary, it may be desirable to define the constraint surface in the adaptive parameter space as a function of reference signal statistics.

Inasmuch as normalized adaptation can require significant signal processing capabilities due to matrix operations, it may be desirable to perform adaptation in accordance with a time-sharing technique. Thus, in another aspect, the invention involves the use of a convenient time-sharing technique in which unconstrained update signal vectors are accumulated over a plurality of sample periods. Linearly independent components of the accumulated update vector are extracted individually from the accumulated update vector, and the extracted linearly independent component is used for constrained adaptation of the adaptive parameters. Preferably, the linearly independent components are orthogonal components which are determined through a decomposition of the covariance matrix for a filtered version of the reference signal or the C path matrix. Normalization of adaptation as well as back-projection is accomplished independently for each component by back-projecting and scaling the respective component used for constrained adaptation on the adaptive parameters. In this manner, computational burdens are significantly reduced, which is especially important in high-dimensional systems. System performance is not compromised as long as each individual linearly independent component is extracted and processed within a reasonable time frame.

The invention can be embodied in a system designed to attenuate or control tonal disturbances such as the system disclosed in U.S. patent application Ser. No. 08/369,925 entitled "Adaptive Control System With Constrained Output and Adaptation", by Steven R. Popovich, now U.S. Pat. No. 5,633,795, issued on May 27, 1997, which utilizes normalized adaptation and null space constraint to optimize system performance. The invention can also be used in a system capable of attenuating or controlling non-periodic disturbances, for instance a system which preferably operates as disclosed in U.S. Pat. No. 5,621,803, entitled "Active Attenuation System With On-Line Modeling of Feedback Path" by Trevor A. Laak, which uses a recursive adaptive filter model. Details of these systems are described in conjunction with the following drawings.

Other features and aspects of the invention may be apparent to those skilled in the art upon inspecting the following drawings and description thereof.

BRIEF DESCRIPTION OF THE DRAWINGS

Adaptive Tonal Control System

Adaptive Broadband Control System

Figure 10:
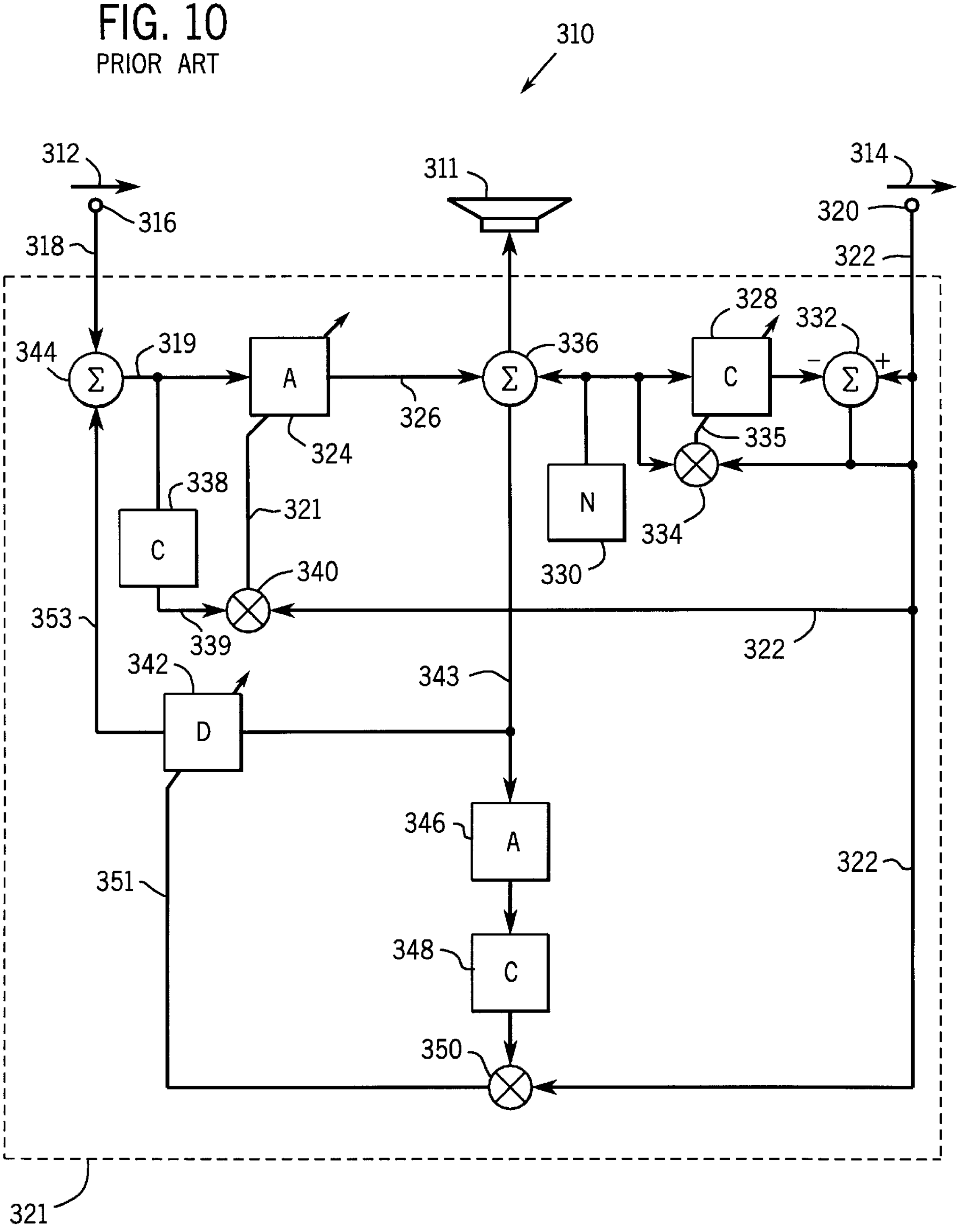
FIG. 10 PRIOR ART

FIG. 10 is a schematic illustration of an active acoustic attenuation system that is capable of attenuating or controlling a non-periodic acoustic disturbance in accordance with U.S. Pat. No. 5,621,803.

Figure 11:
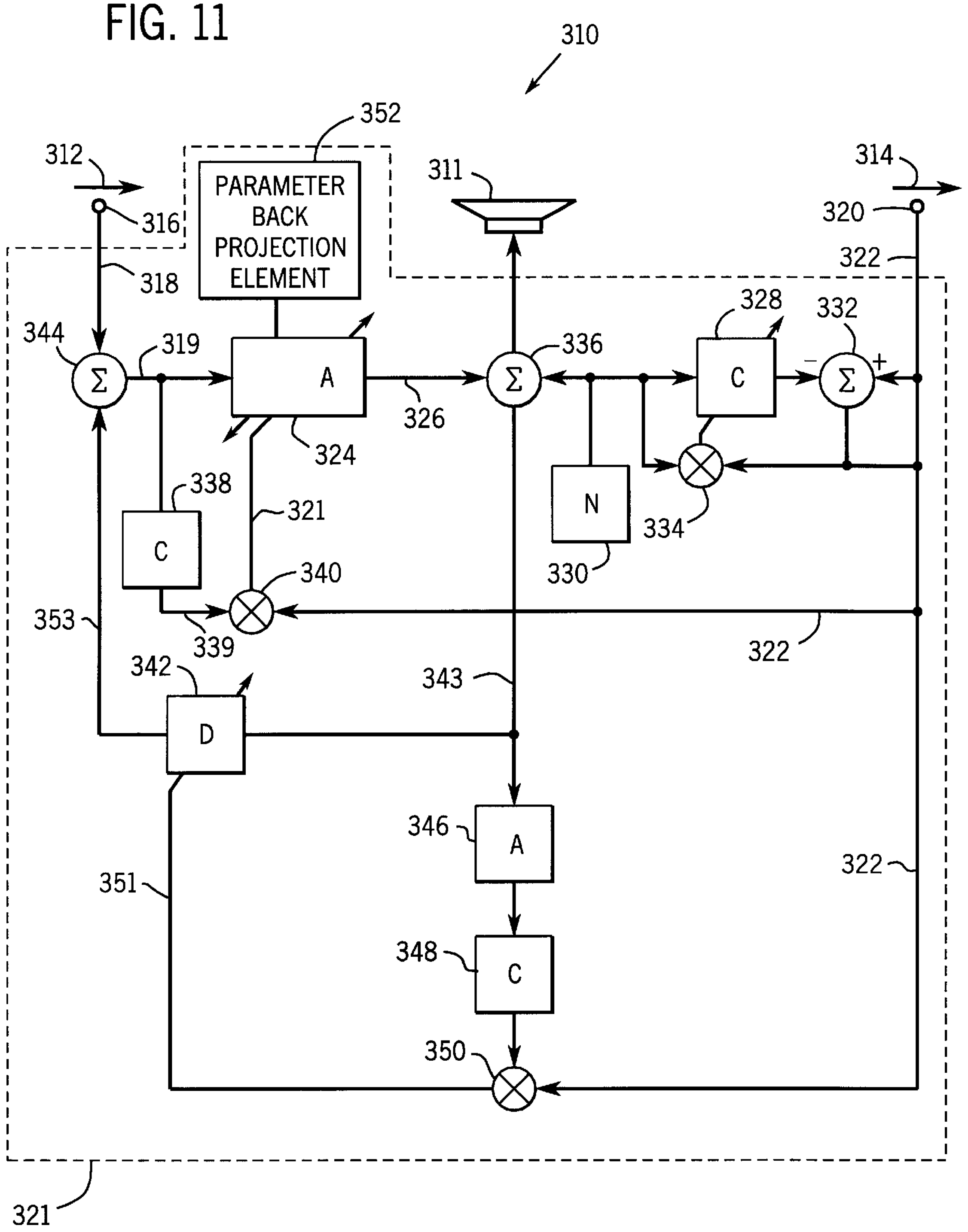

FIG. 11 is a schematic illustration of the system shown in FIG. 10 implementing back-projected adaptation in accordance with the invention.

Figure 12:
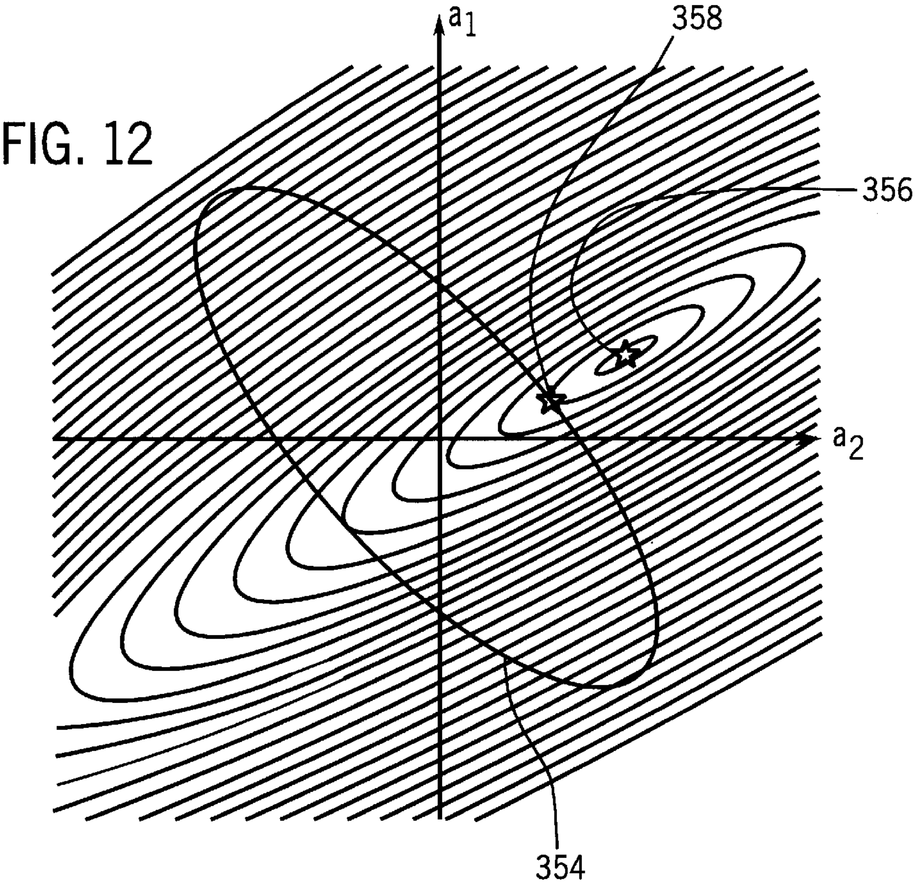

FIG. 12 is a graphical illustration of a typical two-dimensional constraint surface and system error performance contours mapped in the parameter space of the adaptive parameters.

Figure 13:
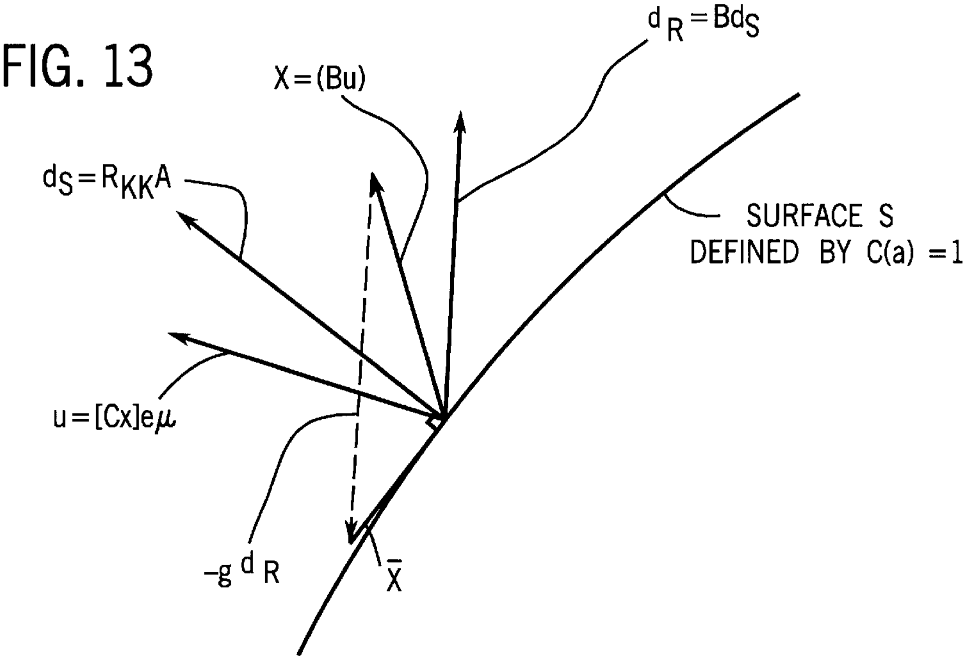

FIG. 13 is a vector diagram of back-projected adaptation for limiting actuator output in accordance with the invention.

Figure 14:
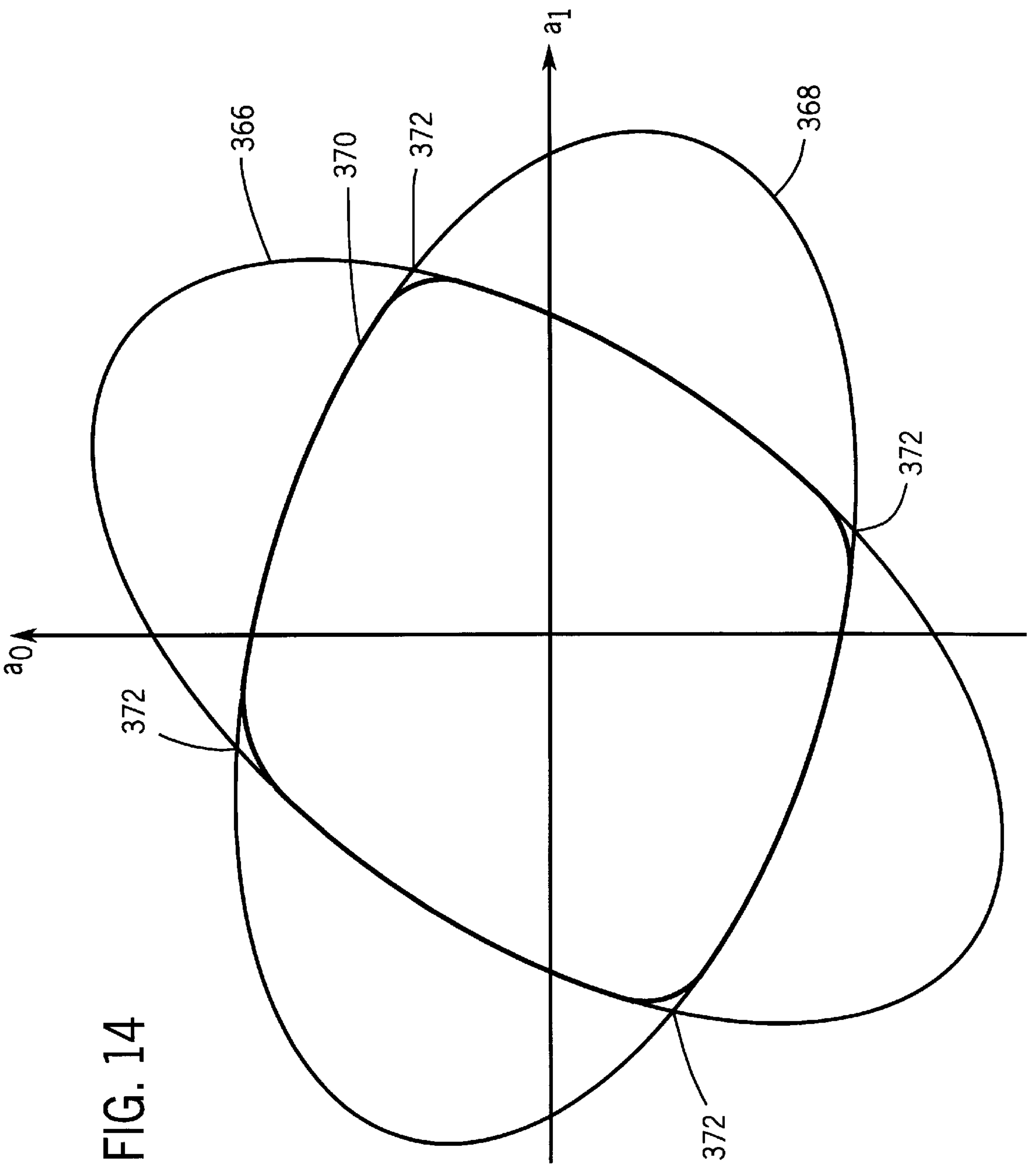

FIG. 14 is a schematic illustration showing a constraint surface in the parameter space combining the efforts of two separate constraint functions.

DETAILED DESCRIPTION OF THE DRAWINGS

Adaptive Tonal Control System

Figure 1A:
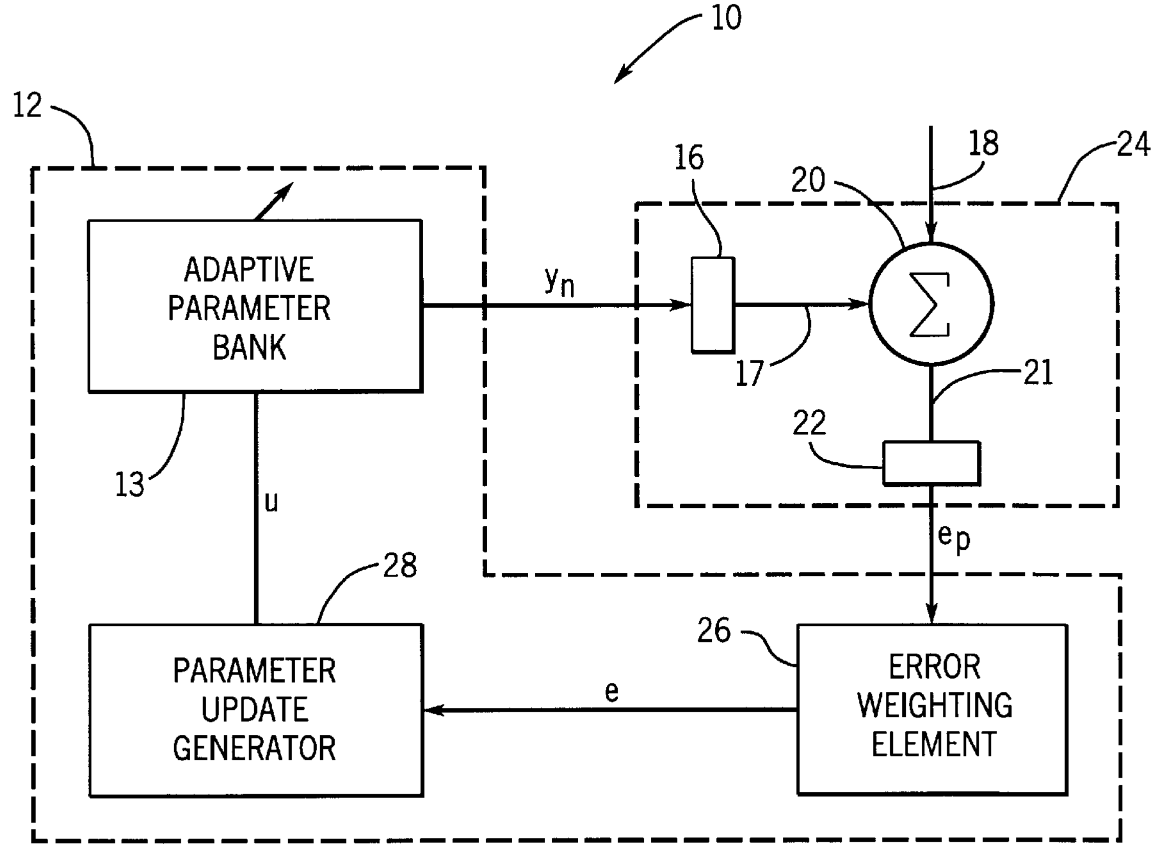
FIG. 1a PRIOR ART
FIG. 1*a* is a schematic illustration of an active acoustic attenuation system that attenuates a tone at a discrete frequency in accordance with copending U.S. patent application Ser. No. 08/369,925, now U.S. Pat. No. 5,633,795.
Figure 1B:
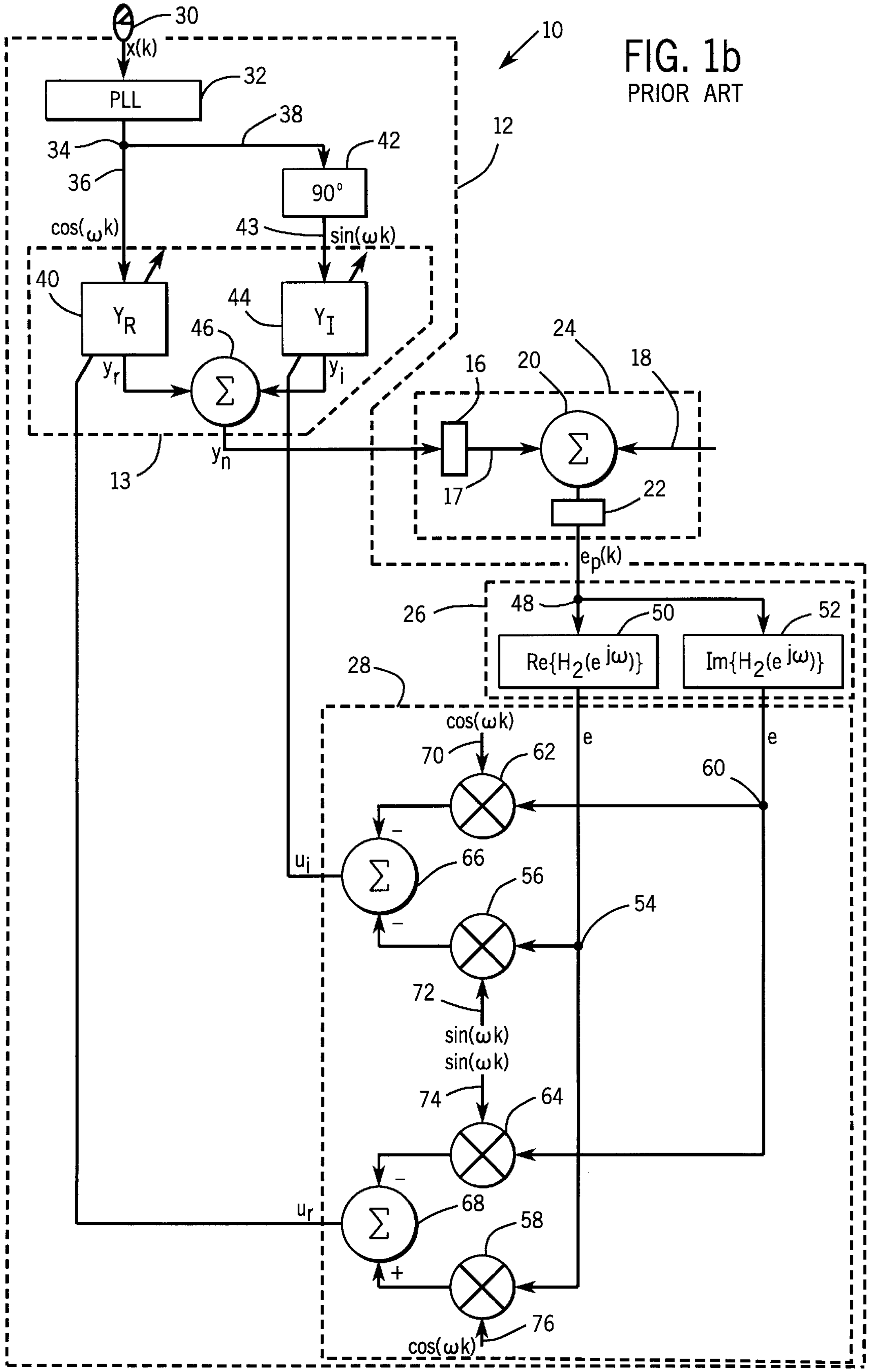
FIG. 1b PRIOR ART
FIG. 1*b* is a detailed schematic illustration of the system shown in FIG. 1*a*.

FIG. 1*a* illustrates an active acoustic attenuation system 10 in accordance with above incorporated, U.S. patent application Ser. No. 08/369,925 entitled "Adaptive Tonal Control System With Constrained Output And Adaptation", by Steven R. Popovich, now U.S. Pat. No. 5,633,795, issued on May 27, 1997. The system 10 uses an adaptive controller 12 to attenuate a tone at a particular frequency in a disturbance 18. The adaptive controller 12 is preferably embodied within a programmable digital signal processor. The adaptive controller 12 has an adaptive parameter bank 13, a parameter update generator 28; and an error weighting element 26. To attenuate several tones at distinct frequencies, several attenuation systems 10 such as shown in FIGS. 1*a* and 1*b* can be implemented separately and contemporaneously on the same digital signal processor. Separate tones are substantially orthogonal so an adaptive controller 12 implementing separate and contemporaneous tonal attenuation systems 10 can effectively attenuate several tones in a disturbance 18.

In the adaptive controller 12, the adaptive parameter bank 13 generates a plurality of n correction signals $y_n$. Each of the n correction signals $y_n$ drives an actuator 16 that provides a secondary input or cancellation signal 17 that combines with a system input to yield a system output 21. That is, the secondary inputs 17 from the actuators 16 propagate into the system and attenuate the disturbance 18 to yield the system output 21 as represented schematically by summing junction 20. A plurality of p error sensors 22 senses the system output 21, and generates p error signals $e_p$. In FIG. 1*a*, the path of the n correction signals $y_n$ through the n actuators 16, the path of the secondary inputs or cancellation signals between the actuators 16 and the error sensors 22, and the path through the p error sensors 22 is defined as a p×n C path (e.g. a p×n speaker-error path), and is illustrated by block 24.

The adaptive controller 12 receives an error signal $e_p$ from each of the p error sensors 22. The controller 12 has an error weighting element 26 (i.e. an n×p matrix) that processes the p error signals $e_p$ to yield n error input signals e.

The parameter update generator 28 in the controller 12 receives the n error input signals e, and generates a set of parameter updates u. The parameter updates u are used to adapt one or more scaling vectors in the adaptive parameter bank 13. The scaling vectors are adapted by accumulating the updates u with the existing scaling vector. The scaling vector is then typically applied to a tonal reference signal to generate the n correction signals $y_n$.

Also, in accordance with the copending patent application, now U.S. Pat. No. 5,633,795, the error weighting element 26 is chosen to improve the convergence of the adaptation process. There are several methods for generating the error weighting element 26, but it is preferred that a C model of the C path 24 be used to generate the error weighting element 26. The C model can be generated off-line, but it is preferred that the C model be adaptively generated on-line as described in U.S. Pat. No. 4,677,676 which is incorporated herein by reference for the purposes of adaptive on-line C modeling. In the system 10, the C model is a p×n matrix, where the $ij^{th}$ element represents the complex frequency response of the pathway from the $j^{th}$ output channel to the output of the $i^{th}$ error sensor at the frequency of the disturbance.

The error sensors 22 preferably generate error signals $e_p$ every sample period k. It is desirable to adapt the controller 12 rapidly in real time with respect to sample period k. This can be approximated over time by demodulating the error input signals e by the in-phase and quadrature components of the particular frequency being attenuated. The demodulation is accomplished using in-phase and quadrature demodulation signals in the parameter update generator 28. The in-phase and quadrature components are formed for the particular frequency being attenuated.

FIG. 1*b* illustrates in detail the system 10 shown in FIG. 1*a*. In FIG. 1*b*, the controller 12 receives an input signal x(k) from an input sensor 30. The input signal x(k) is transmitted to a phase-locked loop circuit 32 in the controller 12. The phase-locked loop circuit 32 outputs a reference signal at a particular frequency which is the frequency of the tone being attenuated. In particular, the reference signal is preferably a discrete time sequence in the form of a cosine wave at a particular frequency. It is preferred that the reference signal have a normalized (e.g. unity) magnitude.

The reference signal is separated into two signals at junction 34: An in-phase reference signal is transmitted through line 36, and a quadrature reference signal is transmitted through line 38. The in-phase reference signal is transmitted through line 36 to an in-phase scaling element 40. The in-phase scaling element 40 multiples the in-phase reference signal by an in-phase scaling vector $Y_R$ (i.e. an adaptive parameter vector) to generate n in-phase components $y_r$ of the adaptive output signals $y_n$. The in-phase scaling element 40 stores the values of the in-phase scaling vector $Y_R$, and updates the values. In U.S. Pat. No. 5,633,795, the values of $Y_R$ are updated by summing the product of an in-phase update signal $u_r$ multiplied by a convergence step size $\mu$.

Contemporaneously, quadrature components $y_i$ of the output signals $y_n$ are generated. The quadrature reference signal is transmitted through line 38 to a phase shifter 42 that shifts the quadrature reference signal 90° to in effect generate a sine wave corresponding to the cosine wave. Thus, in this context, the term quadrature reference signal corresponds to a reference signal that has been phase shifted 90° from the in-phase reference signal. The quadrature scaling element 44 multiplies the quadrature reference signal by a quadrature scaling vector $Y_I$ (i.e. an adaptive parameter vector) to generate m quadrature components $y_i$ of the adaptive output signals $y_n$. The scaling element 44 stores the values of the quadrature scaling vector $Y_I$, and updates the values. In U.S. Pat. No. 5,633,795, the values of $Y_I$ are updated by summing the values by the product of a quadrature update signal $u_i$ multiplied by the step size $\mu$.

The n in-phase output signals $y_r$ and the n quadrature $y_i$ output signals are summed at summer 46 to generate n correction signals $y_n$. The n correction signals $y_n$ are transmitted to n actuators 16.

The error weighting element 26 is determined using the p×n C matrix to eliminate problems associated with overparameterization and to also account for phase shifts and delay in the auxiliary C path 24. In accordance with U.S. Pat. No. 5,633,795, the C matrix can be decomposed at the frequencies of interest using singular value decomposition as represented below:

$$C=USV^H \tag{1A}$$

where U is a p×p matrix, S is a p×n matrix, and $V^H$ is an n×n hermitian transpose of an n×n matrix V. The matrices U and V are unitary matrices, and the off diagonal elements of S are zero while the diagonal elements are in general real and positive. The error weighting element 26 applies an n×p matrix $H_2=BC^H$, where $B=VN^HNV^H$, V is the n×n matrix defined in equation (1A); $N^H$ is an n×p matrix that is the hermitian transpose of normalizing matrix N which is formed by inverting some of the values on the diagonal of S (e.g., the values that are not zero or close to zero). Setting B=I (identity matrix) results in a gradient descent update. The use of transformation matrix B is to compensate the gradient descent update, thus creating a normalized update which improves the rate of convergence by providing a more direct adaptation path.

Error weighting element 26 preferably has a junction 48, an in-phase weighting element 50 and a quadrature weighting element 52. Each of the p error signals $e_p$ is transmitted to the junction 48, and the p error signals $e_p$ are then contemporaneously transmitted to the in-phase weighting element 50 and to the quadrature weighting element 52. The in-phase element 50 of the error weighting element 26 contains the real parts of the complex elements of the error weighting matrix $H_2$. The quadrature element 50 of the error weighting element 26 contains the coefficients of the imaginary parts of the complex elements of the error weighting matrix $H_2$. Both the in-phase 50 and the quadrature 52 elements of the error weighting element 26 contain real values. When referring herein to in-phase and quadrature weighting element, the term in-phase weighting element refers to the real parts of the complex elements in a weighting matrix, and the term quadrature weighting element refers to the imaginary parts of the complex elements in a weighting matrix. The p error signals $e_p$ are processed contemporaneously through the in-phase element 50 and the quadrature element 52 to each provide n error input signals e. Both sets of n error input signals are real, and are transmitted to the update generator 28.

The update generator 28 includes junctions 54 and 60, multipliers 56, 58, 62 and 64, and summers 66 and 68. The set of n error input signals e from the in-phase element 50 of the error weighting element 26 is transmitted to junction 54, where the signals e are split. From junction 54, one set of n error input signals e is provided to multiplier 56, and another set of n error input signals e is provided to multiplier 58. Likewise, the set of n error input signals e from the quadrature element 52 of the error weighting element 26 is transmitted to junction 60, where the signals e are split. From junction 60, one set of n error input signals e is provided to multiplier 62, and another set of n error input signals e is provided to multiplier 64.

The n error input signals e provided to multiplier 62 are multiplied by the in-phase demodulation signal 70, which is preferably the same as the normalized in-phase reference signal 36. The n error input signals e provided to multiplier 56 are multiplied by the quadrature demodulation signal 72, which is preferably the same as the normalized phase-shifted quadrature reference signal in line 43. This demodulation should occur during each sample period of adaptation. The output from multipliers 56 and 62 is summed in summer 66 to generate the negative of n updates $u_i$ for the quadrature scaling vector $Y_I$ in the quadrature scaling element 44 that generates the quadrature components $y_i$ of the output signals.

The n error input signals e provided to multiplier 58 are multiplied by the normalized in-phase demodulation signal 76. The n error input signals e provided to multiplier 64 are multiplied by the normalized quadrature demodulation signal 74. This demodulation should occur during each sample period of adaptation. The output from multipliers 58 and 64 is subtractively summed in summer 68 to generate n updates $u_r$ for the in-phase scaling vector $Y_R$ in the in-phase scaling element 40 that generates the n in-phase reference signals $y_r$.

As mentioned earlier, the scaling vectors $Y_R$ and $Y_I$ are the adaptive parameters in the adaptive parameter bank 13. In U.S. Pat. No. 5,633,795, unconstrained update signals $u_r$ and $u_i$ are used to adapt the scaling vectors $Y_R$ and $Y_I$, respectively. Each scaling vector $Y_R$ and $Y_I$ contains n components.

Figure 2:
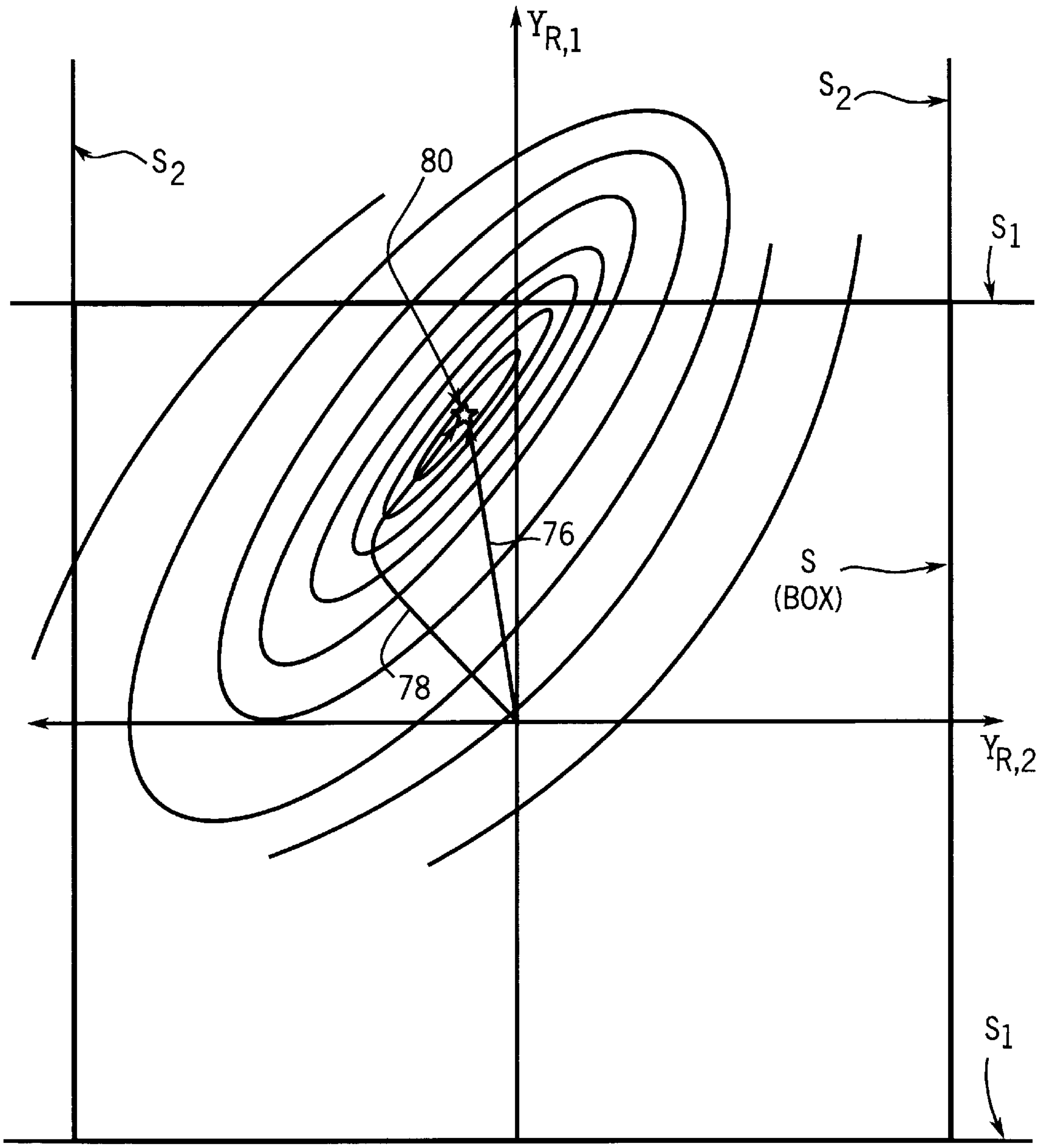
FIG. 2 is a graphical illustration of the difference between a convergence path for gradient descent adaptation and a convergence path for normalized adaptation.

Referring now to FIG. 2, the use of transformation matrix B improves the rate of convergence, and improves the performance of the system 10. FIG. 2 illustrates representative adaptation trajectories in a system having two actuators 16 for a normalized update 76 in contrast to a gradient descent update 78. For simplicity of illustration, the plot in FIG. 2 shows the real part of two scaling vectors $Y_R$, and assumes that quadrature scaling vector $Y_I$=0. The plot in FIG. 2 shows quadratic error performance surface contours (i.e., contours representing level of error cost function) for an optimal solution depicted by star 80. The box shown in bold represents a constraint surface S for the system 10. This constraint surface encloses the intersection for the interiors of two distinct constraint functions $S_1$ and $S_2$ relating to a first and second actuator, respectively. In particular, $S_1$ represents a limit for the absolute value of the adaptive parameter $Y_{R,1}$ and $S_2$ represents a limit for the absolute value of the adaptive parameter $Y_{R,2}$. The actuators 16 have a generally linear response inside of the constraint function S. If the adaptive parameter values exist outside of S, at least one of the constraint functions $S_1$ or $S_2$ will be violated. In this case the actuator response may become nonlinear and damage or instability may result. FIG. 2 illustrates a situation in which the optimal solution 80 lies within the constraint surface S for both actuators 16. Note that under these conditions, the normalized update 76 converges to the same optimal solution 80 as the gradient descent update 78, but the trajectory of the normalized update 76 follows a more direct path towards the optimal solution 80 in contrast to the less direct path of the gradient descent update 78. The adaptation trajectory of the gradient descent update 78 is orthogonal to the performance surface contours. The trajectory of the gradient descent update 78 is different than the trajectory of the normalized update 76 unless the eigenvalues for the matrix product $C^HC$ are equal. Therefore, when the optimal solution 80 lies within the constraint surface S, the normalized update 76 provides the same solution 80 as the gradient descent update 78, but normally does so at a faster rate of convergence, thereby improving system 10 performance.

Figure 3A:
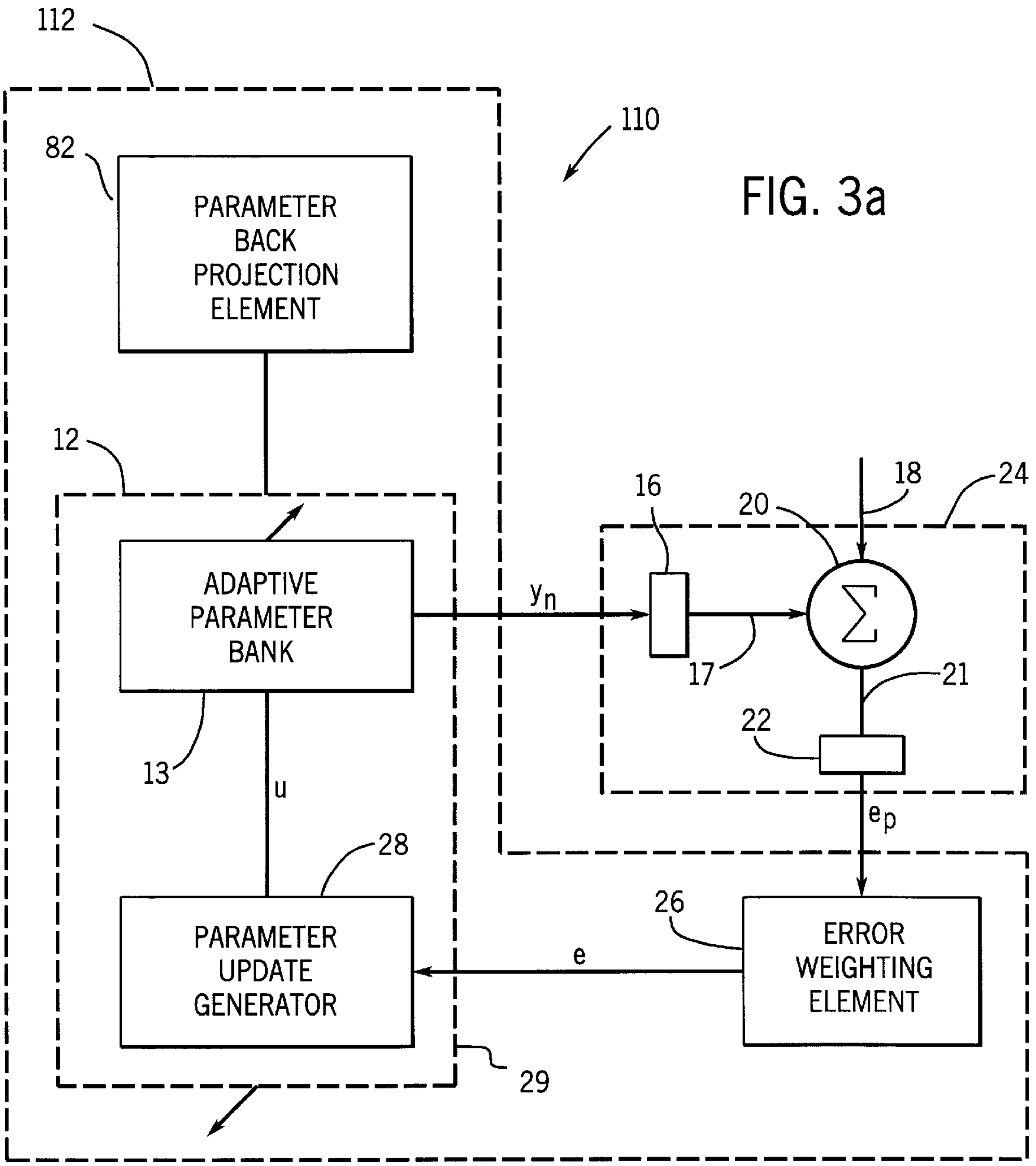
FIG. 3*a* is a schematic illustration of an active tonal attenuation system with back-projected adaptation in accordance with the invention.

Occasionally, the optimal solution 80 lies outside of the constraint surface S, which means that if allowed to adapt in the absence of any constraint, the adaptive control system 12 would attempt to drive at least one of the actuators 16 beyond its physical capabilities. Under such conditions, the secondary input or cancellation signal 17 from the actuator 16 might not be commensurate with the correction signal $y_n$ received by the actuator 16 from the adaptive parameter bank 13. This is potentially damaging or unstable. FIG. 3*a* shows an adaptive control system 110 having a parameter back-projection element 82 for constraining adaptation to prevent these conditions in accordance with the invention.

Referring to FIG. 3*a*, the purpose of the parameter back-projection element 82 is to constrain adaptation of adaptive parameters (e.g., scaling vectors $Y_R$, $Y_I$) in the adaptive parameter bank 13 so that no correction signal $y_n$ exceeds its selected limit. Like reference numbers are used to describe the adaptive tonal control system 110 shown in FIG. 3*b* as were used in describing system 10 in FIG. 1*a* where appropriate to facilitate understanding.

The system 110 in FIG. 3*a* has an adaptive controller 112 to attenuate a tone at a particular frequency in a disturbance 18. The adaptive controller 112 includes an adaptive parameter bank 113, a parameter back-projection element 82, an error weighting element 126, and a parameter update generator 128. To attenuate several tones at distinct frequencies, several attenuation systems 110 can be implemented separately and contemporaneously on the same digital signal processor, or on two or more networked digital signal processors.

In the adaptive controller 112, the adaptive parameter bank 113 generates a plurality of n correction signals $y_n$. Each of the n correction signals $y_n$ drives an actuator 16 that provides a secondary input or cancellation signal 17 that combines with a system input to yield a system output 21. That is, the secondary input 17 from the actuator 16 propagate into the system and attenuate the disturbance 18 to yield the system output 21 as represented schematically by summing junction 20. A plurality of p error sensors 22 senses the system output 21 and generates p error signals $e_p$. The combined path of the n correction signals $y_n$ through the n actuators 16, from the actuators 16 to the error sensors 22, and through the p error sensors 22, is defined as a p×n auxiliary C path (e.g. a p×n speaker-error path), and is illustrated schematically by block 24.

The adaptive controller 112 receives an error signal $e_p$ from each of the p error sensors 22. The error weighting element 126 processes the p error signals $e_p$ to yield n error input signals e. The error weighting element 126 is preferably an n×p matrix. In this embodiment, the error weighting element 126 applies an n×p matrix $H_2=BC^H$, where $C^H$ is the hermitian transpose of the p×n C matrix representing speaker-error path 24, and B is an n×n transformation matrix defined by $B=V\bar{\Lambda}V^H$ where matrix V is determined in accordance with an eigenvalue decomposition of $C^HC$, V is an n×n unitary matrix, $V^H$ is the hermitian transpose of matrix V, $\Lambda$ is a real diagonal matrix containing the eigenvalues of $C^HC$, and $\bar{\Lambda}$ is formed by inverting non-trivial diagonal entries of $\Lambda$ down to an inversion limit defined in relation to the maximum eigenvalue.

If the dimensions of the system 110 are not large, the above processing matrices (e.g. matrices C, $\bar{\Lambda}$, B, V etc.) are likely to be realizable in a single processor having realistic processing capacity because it is necessary to have C path information only at the one or more discrete frequencies of interest for cancellation.

The parameter update generator 128 in the controller 112 receives the n error input signals e, and generates a set of unconstrained updates u. The unconstrained updates u are used to adapt the adaptive parameters (i.e., scaling vectors $Y_R$ and $Y_I$) in the adaptive parameter bank 113 as discussed with respect to FIGS. 1*a* and 1*b* without modification, unless such adaptation requires that one of the correction signals $y_n$ drive a respective actuator 16 substantially beyond the constraint surface S. In accordance with the invention, the parameter back-projection element 82 generates back-projection signals that are combined with the unconstrained update signals u to constrain adaptation of the adaptive parameters with respect to the constraint surface S defined in the parameter space of the adaptive parameters (e.g. scaling vector $Y_R$, $Y_I$). In other words, the constraint surface S surrounds a desired region for adaptation in the parameter space of the adaptive parameters. Adaptation of the adaptive parameters is constrained so that none of the adaptive parameters lie substantially outside of the desired region in the parameter space. In FIG. 3*a*, the parameter back-projection element 82 is shown to operate collectively on the adaptive parameter bank 13 and the parameter update generator 28 contained within dashed block 29. This is meant to illustrate that parameter back-projection can be accomplished either on the updated adaptive parameters (i.e. $Y_R$, $Y_I$) or on the parameter updates u.

Figure 3B:
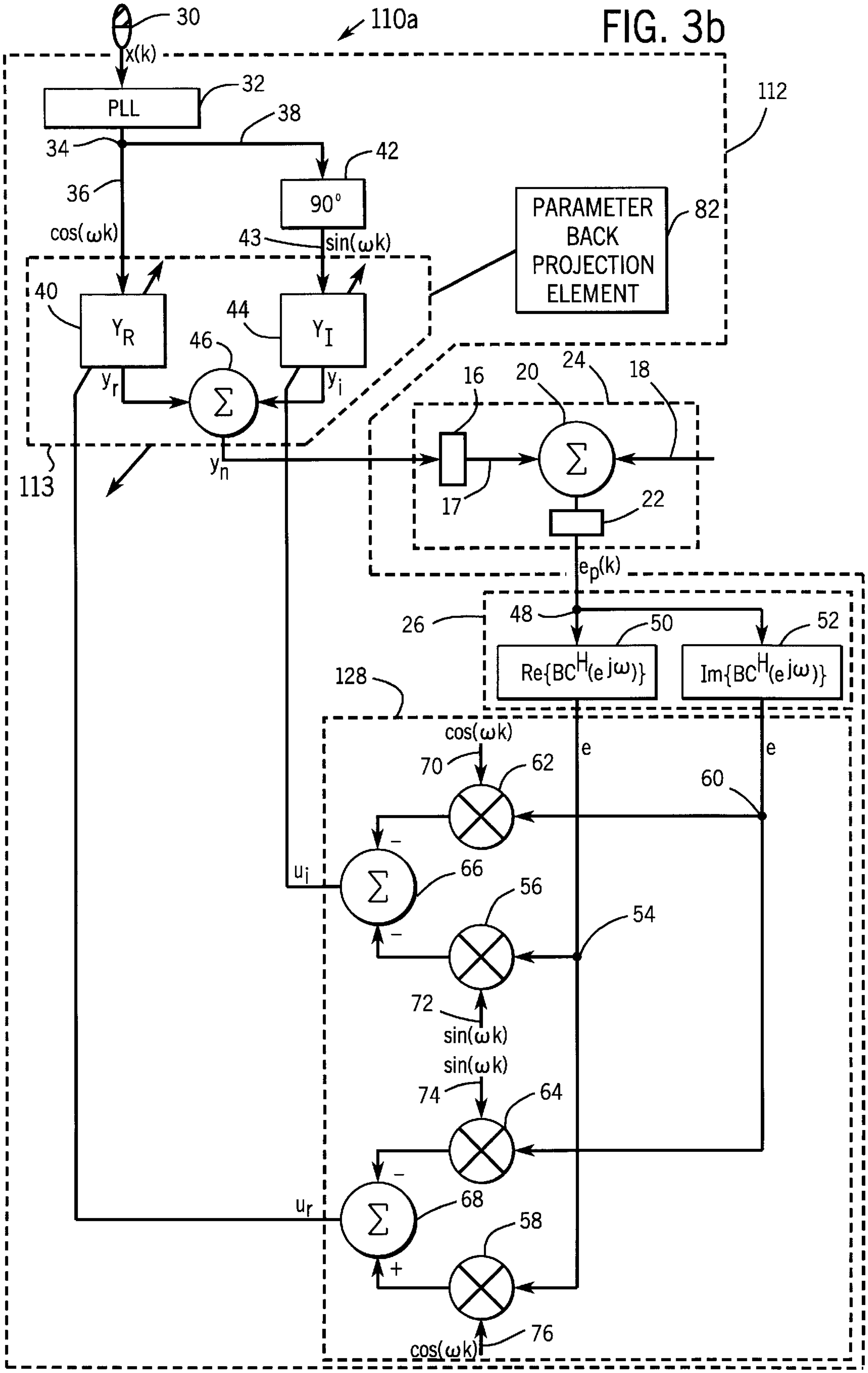
FIG. 3*b* is a detailed schematic illustration of the system shown in FIG. 3*a*.

FIG. 3*b* illustrates in detail a system 110*a* which is a version of the system 110 shown in FIG. 3*a*. In the system 110*a* shown in FIG. 3*b*, the parameter back-projection element 82 operates specifically on the adaptive parameter bank 113. Referring now to FIG. 3*b*, the adaptive parameter bank 113 includes one or more scaling vectors such as $Y_R$, $Y_I$ which are adapted by accumulating update signals $u_r$, $u_i$. The scaling vectors $Y_R$, $Y_I$ are applied to a tonal reference signal from lines 36 and 43, respectively, to generate the n correction signals $y_n$. The parameter back-projection element 82 constrains adaptation of scaling vectors $Y_R$, $Y_I$ when unconstrained accumulation of update signals $u_r$, $u_i$ would cause one or more correction signals $y_n$ to lie beyond a selected physical limit value relating to a physical limitation of the system. The physical limit value would typically be selected as a maximum allowable value of the means-squared voltage applied to the respective actuator, or the maximum allowable value of means-squared current applied to the respective actuator. In addition, it may be desirable that the physical limit value relate to the maximum allowable value of the means-squared displacement for an output component of the respective actuator, such as loudspeaker diaphragm displacement. This maximum allowable value may be chosen in response to a peak amplitude limit in the case of a tonal disturbance.

The controller 112 receives an input signal x(k) from an input sensor 30. The input signal x(k) is transmitted to a phase-locked loop circuit 32 in the controller 112. The phase-locked loop circuit 32 outputs a reference signal at a particular frequency, which is the frequency of the tone being attenuated. The reference signal is preferably a discrete time sequence in the form of a cosine wave at a particular frequency. It is preferred that the reference signal have a normalized magnitude (e.g. unity). Other methods of obtaining a reference signal can be used within the spirit of the invention, however, the phase-locked loop circuit 32 is preferred because it enables frequency tracking and a normalized input signal. In most applications, it is preferred that the constraint surface S define a fixed surface in the parameter space for the adaptive parameters. However, in cases where reference signal statistics are non-stationary, it may be desirable to periodically redefine the constraint surface S in response to the changing reference signal statistics. In the system shown in FIG. 3B, the reference signal x(k) is generated by a phase-locked loop 32, so the use of a fixed constraint surface S is preferred.

The reference signal x(k) is separated into two signals at junction 34: an in-phase reference signal is transmitted through line 36, and a quadrature reference signal is transmitted through line 38. The in-phase reference signal is transmitted through line 36 to an in-phase scaling element 40. The in-phase scaling element 40 multiplies the in-phase reference signal by an in-phase scaling vector $Y_R$ to generate n in-phase components $y_r$ of the n correction signals $y_n$. The in-phase scaling element 40 stores the values of the in-phase scaling vector $Y_R$ and updates the values. The values of $Y_R$ are updated by summing the product of an in-phase update signal $u_r$ multiplied by a step size $\mu$, unless it is necessary to constrain adaptation so none of the correction signals $y_n$ exceed the selected physical limit value.

Contemporaneously, quadrature components $y_i$ of the correction signals $y_n$ are generated. The quadrature reference signal is transmitted through line 38 to a phase shifter 42 that shifts a quadrature reference signal 90° to in effect generate a sine wave corresponding to the cosine wave. The quadrature scaling element 44 multiplies the quadrature reference signal by a quadrature scaling vector $Y_I$ to generate n quadrature components $y_i$ of the n correction signals $y_n$. The scaling element 44 stores the values of the quadrature scaling vector $Y_I$ and updates the values by summing the values of the product of the quadrature update signal $u_i$ multiplied by the step size $\mu$, unless it is necessary to constrain adaptation so none of the correction signals $y_n$ exceed the selected limit.

The n in-phase output signals $y_r$ and the n quadrature output signals $y_i$ are summed at summer 46 to generate n correction signals $y_n$. The n correction signals $y_n$ are transmitted to the n actuators 16.

The array of error sensors 22 generate p error signals $e_p$ preferably every sample period k. The p error signals $e_p$ are transmitted to error weighting element 126, which is similar to the error weighting element 26 in system 10 shown in FIGS. 1*a* and 1*b*, however, it is preferred in system 110 that the in-phase weighting element 50 be represented by the Re $\{H_2\}$ and the quadrature weighting element 52 is represented by the Im $\{H_2\}$. The preferred parameter update generator 128 in system 110 shown in FIGS. 3*a* and 3*b* is the same as the parameter update generator 28 preferably used in system 10 described in FIGS. 1*a* and 1*b*.

Figure 4:
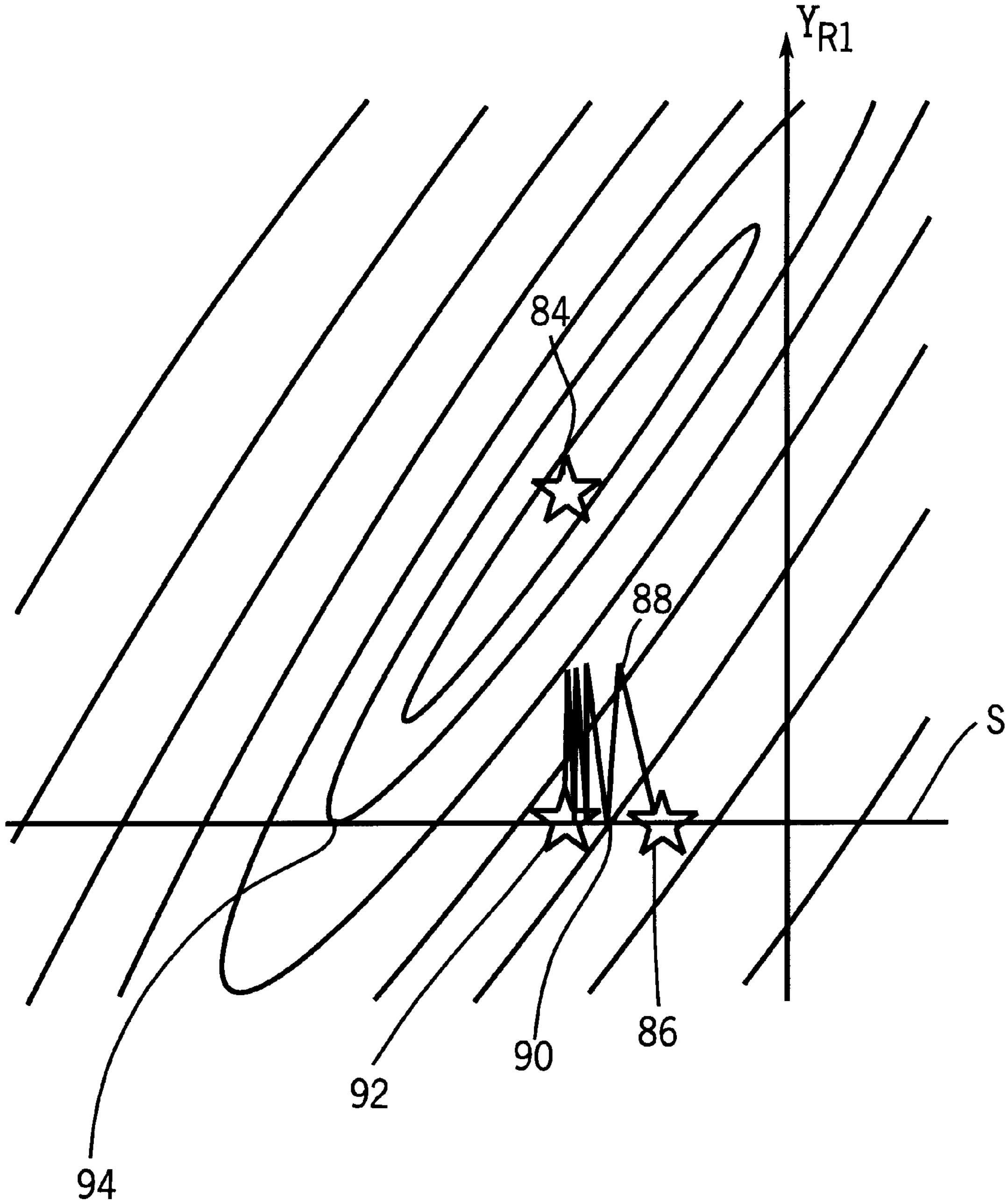
FIG. 4 is a graphical illustration of the convergence of a normalized parameter update combined with uncompensated back-projection.

Referring to FIG. 4, star 86 represents a point along the adaptation trajectory of the scaling vector $Y_R$, as the scaling vector $Y_R$ is being adapted under fully normalized conditions, where the scaling vector $Y_R$ traverses the constraint surface S. In the absence of the parameter back-projection element 82, normalized adaptation would attempt to occur from point 86 directly towards an optimum non-constrained solution 84 in accordance with the step size $\mu$ to point 88. For simple back-projection, adaptation beyond the constraint surface S is constrained by back-projecting from point 88 to the constraint surface S in a direction orthogonal to the constraint surface S to point 90. Performance of the system at point 90 is improved over the performance at point 86. In terms of error cost function, the point 90 is closer to the optimum non-constrained solution 84 than point 86. As the system continues to adapt and back-project to the constraint surface S, the constrained solution migrates along the constraint surface S to point 92. At point 92 along the constraint surface S, the direction of the unconstrained update vector u is approximately parallel to the direction of back-projection vector g, thus rendering point 92 as a final solution along the constraint surface S. However, the optimal constrained solution occurs at point 94 where the cost function performance curve is tangential to the constraint surface S. Therefore, it is desirable that constrained adaptation converge at point 94, rather than at point 92.

Figure 5:
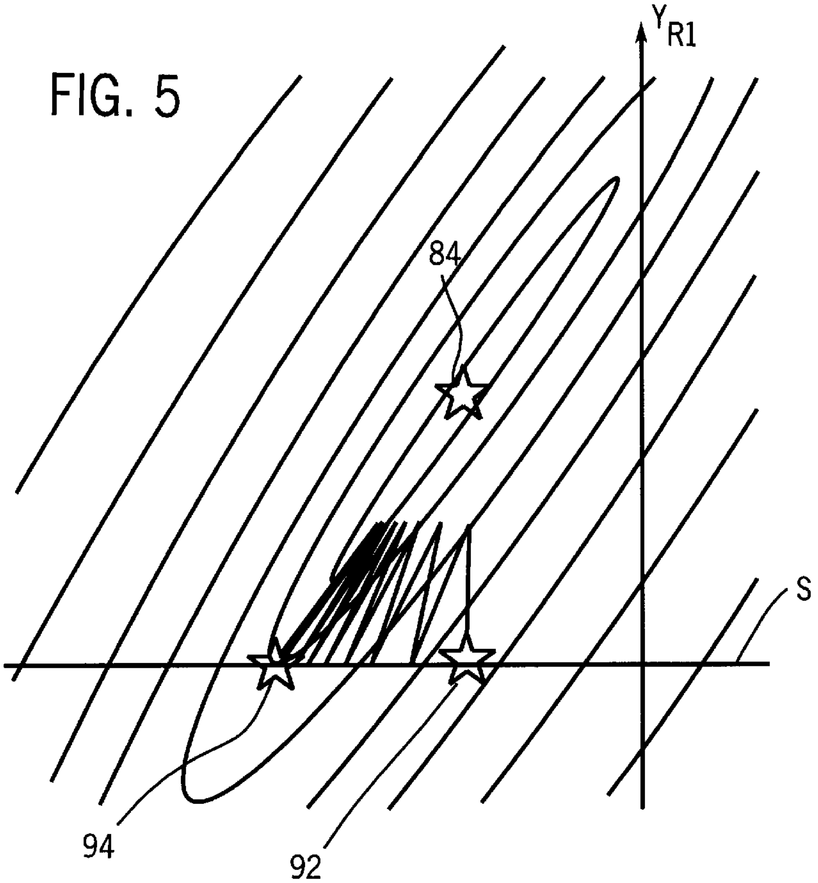
FIG. 5 is a graphical illustration of back-projected adaptation in which the back-projection is compensated for normalized adaptation.

Referring now to FIG. 5, back-projected adaptation converges at the optimal constrained solution 94 if back-projection is compensated to account for adaptation normalization (i.e. compensated in accordance with the transformation matrix B). As long as the length of the back-projection is small and the rotation of back-projection does not exceed 90° with respect to the constraint surface S, the constraint surface S can be treated as a flat surface evaluated from the point of departure, and the back-projection will intersect the surface S.

Figure 6:
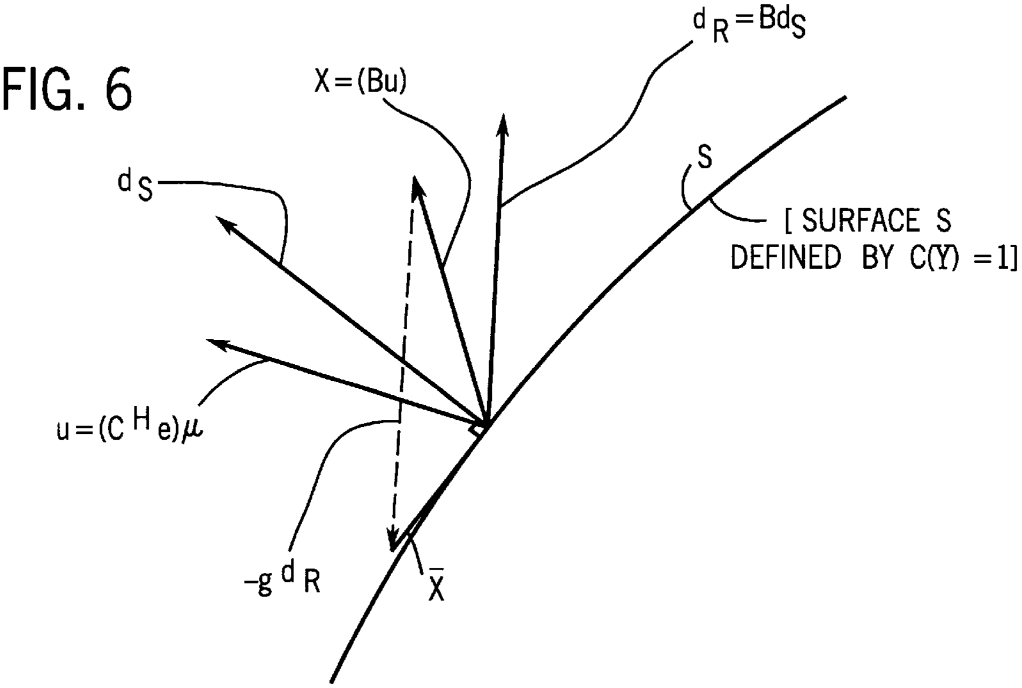
FIG. 6 is a vector diagram of back-projected adaptation for limiting actuator output in accordance with the invention.

FIG. 6 is a graphical depiction of back-projected adaptation which is compensated for normalized adaptation in accordance with the invention. In FIG. 6, vector $u=C^H e_I\mu$ represents the update signal using a gradient descent method. The vector $\chi=Bu$ represents a normalized update signal generated from the gradient descent vector via the transformation matrix B. The vector $d_S$ is a vector normal to the constraint surface S and the vector $d_R$ is determined from $d_S$ via the transformation matrix B according to the relation $d_S=Bd_R$. Compensated back-projection is illustrated by vector $-gd_R$. The normalized update vector lying tangent to the plane is shown in FIG. 6 as vector $\overline{\chi}$, where it is given by the vector sum $\overline{\chi}=\chi-gd_R$. The value for g is determined such that this vector sum lies tangent to the plane, or equivalently, such that it is orthogonal to $d_S$. Using this method, the vector $d_S$ sufficiently characterizes the constraint surface for the purpose of back-projection to a tangent plane. FIG. 5 illustrates that continued normalized adaptation with compensated back-projection results in the system converging at the optimum constrained solution 94.

Figure 7:
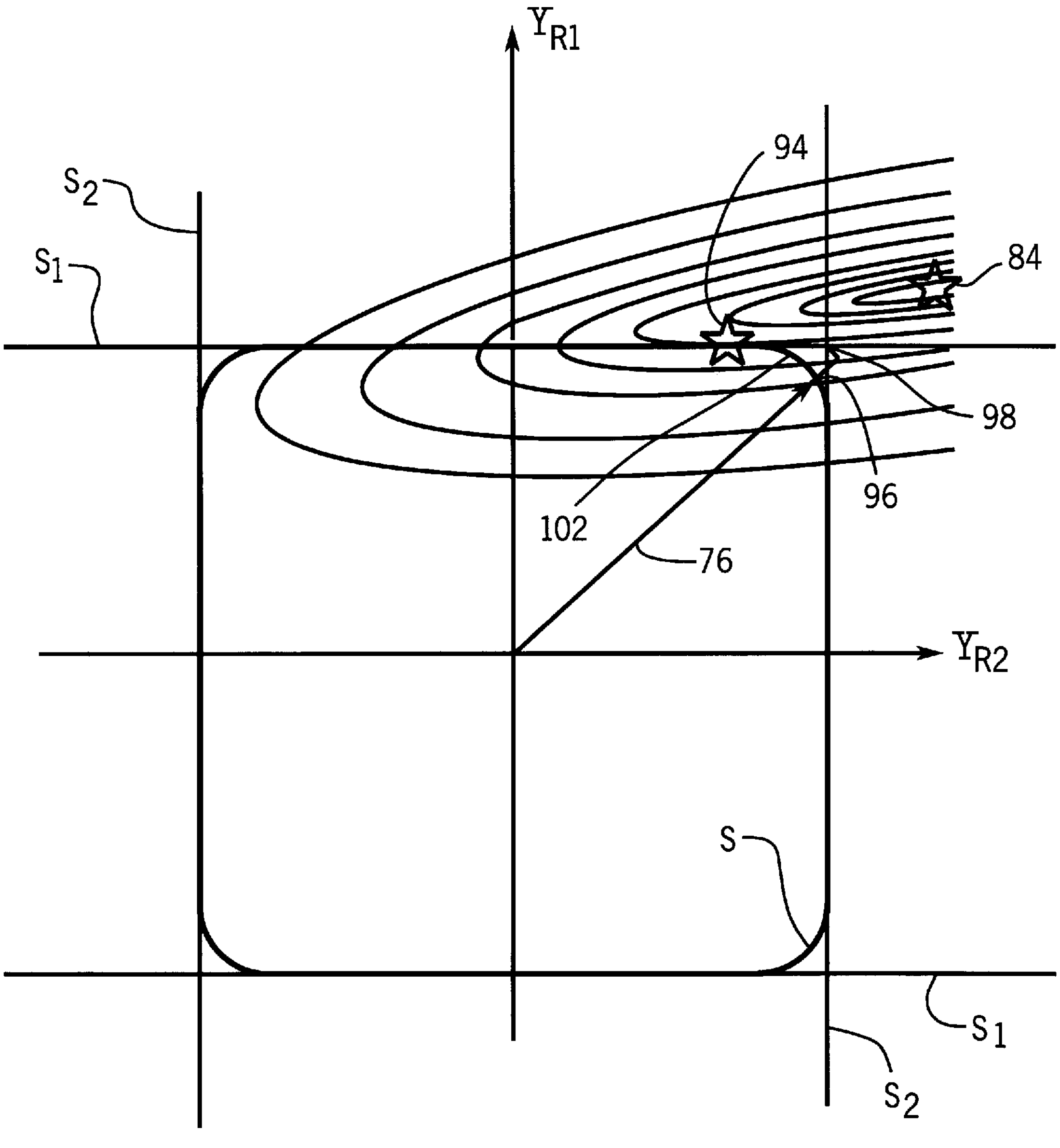
FIG. 7 is a graphical illustration of using a smooth convex constraint surface that represents the combined constraint surface for two actuators in the system.

FIG. 7 illustrates the behavior of the back-projected update at the intersection of multiple constraints. For instance, the intersection of the boundary of the constraint $S_1$ for a first actuator and the boundary of the constraint $S_2$ for a second actuator. Line 76 shows the trajectory of normalized adaptation towards the optimal unconstrained solution 84 until the scaling vector (i.e. adaptive parameters) reaches the selected limit $S_2$ for the second actuator. As adaptation continues in accordance with the compensated back-projection technique, adaptation migrates from point 96 along the surface defined by $S_2$ to the intersection 98 between $S_1$ and $S_2$. However, at the intersection 98, the orientation of the tangent plane is not specifically defined. To overcome this problem, it is desirable to round the surface at the intersection 98 between constraint surfaces $S_2$ and $S_1$, see reference number 102. In this manner, back-projected adaptation will progress around the rounded corner 102 until adaptation converges at the optimal constrained solution 94, located along $S_1$, as long as step size $\mu$ and/or transformation matrix B are selected properly.

FIG. 7 graphically illustrates the use of a single constraint S to approximate multiple constraints surface $S_1$ and $S_2$. In mathematical terms, the preferred constraint function for a single tone system is defined as:

$$c(Y_R, Y_I) = \sum_n \left[ \frac{(Y_{R,n}^2 + Y_{I,n}^2)}{G_n} \right]^p = 1 \tag{2A}$$

And in a multiple tone system, the constraint function is defined as:

$$c(Y_R, Y_I) = \sum_n \left[ \frac{\sum_t (Y_{R,n,t}^2 + Y_{I,n,t}^2)}{G_n} \right]^p = 1 \tag{2A'}$$

The constraint S is defined to be the set of points satisfying equations (2A) or (2A').

In equations (2A) and (2A'), $Y_R$ and $Y_I$ represent scaling vectors, $G_n$ represents the maximum allowable output power level for the $n^{th}$ actuator, and p is a multiple constraint approximation factor. Choosing too small of a value of p can cause excessive and unnecessary power limiting. Using too large of a p value mandates the use of a smaller step size $\mu$. Hence, a trade-off exists between the level of approximation for multiple constraints and the adaptation rate which can be achieved.

If unconstrained adaptation causes one or more of the adaptive parameters to substantially lie outside of the constraint surface S, back-projection should be accomplished as follows. A vector normal to the constraint surface S can be found by taking the gradient of $c(Y_R, Y_I)$ with respect to $Y_R$ and $Y_I$. For a single tone case, a vector $d_S$ normal to the constraint surface S is defined by:

$$d_S=[y_1(y^*_1y_1)^{p-1}, \ldots ,y_n(y_n{}^*y_n)^{p-1}]^T. \tag{3A}$$

where operator * denotes taking the compar conjugate. Transforming the vector $d_S$ by transformation matrix B results in:

$$d_R=Bd_S. \tag{4A}$$

Given an unconstrained update vector u, a back-projection gain factor g (scalar) is defined by the following equation:

$$g = \frac{\overline{\chi} d_S + d_S^H \overline{\chi}}{d_R^H d_S + d_S^H d_R}. \tag{5A}$$

The compensated, back-projected update $\overline{\chi}$ is defined by the following vector equation:

$$\overline{\chi}=Bu-gd_R. \tag{6A}$$

Due to the curvature of the surface S, a slight correction factor may be required such as:

$$y=g_c y \text{ where } g_c=(c(Y))^{-1/2p} \tag{7A}$$

Figure 8A:
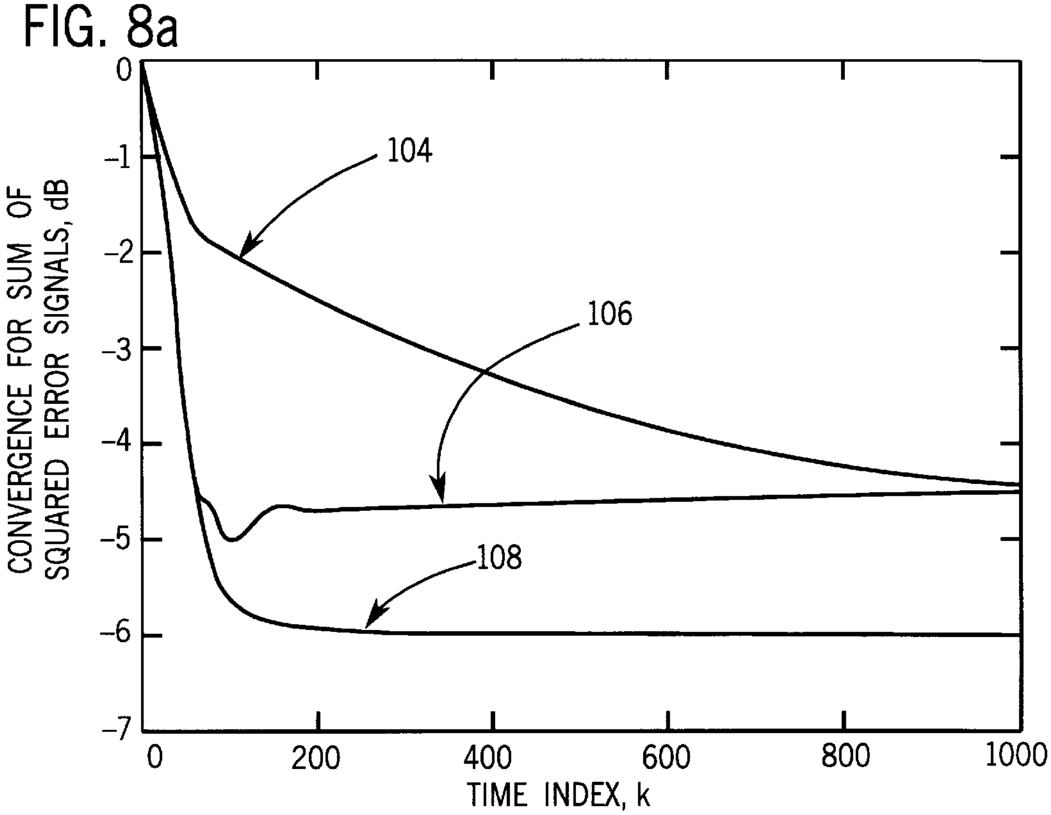
FIG. 8*a* is a plot depicting the rate at which a system in accordance with the invention converges.
Figure 8B:
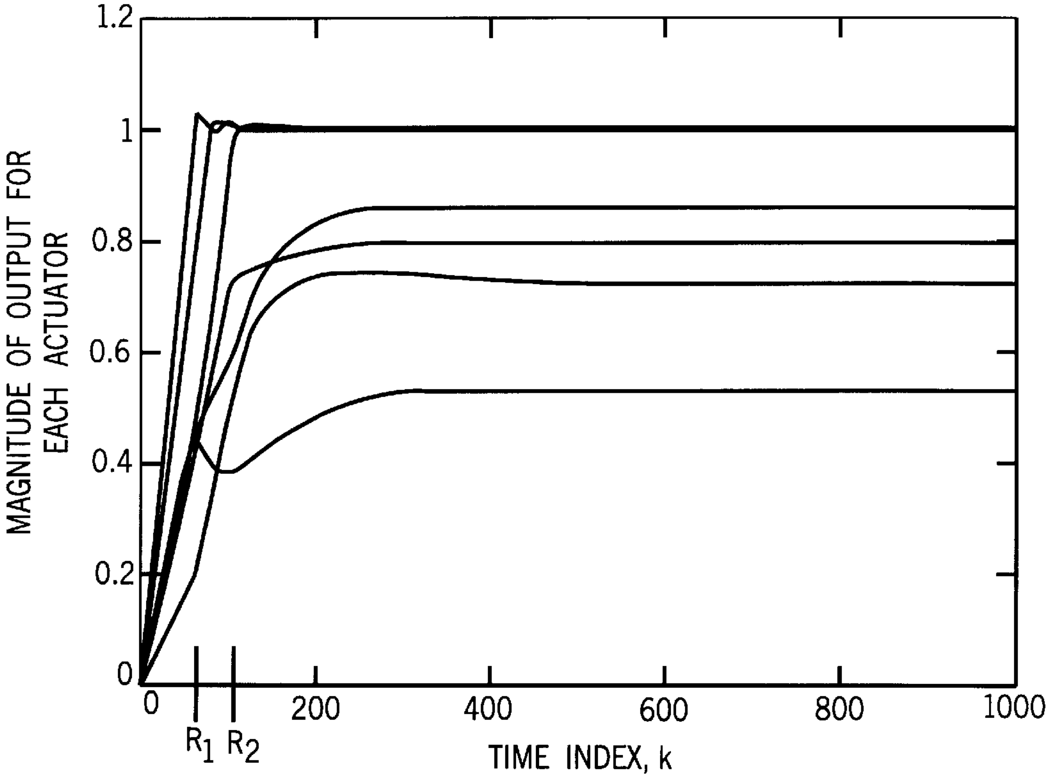
FIG. 8*b* is a graph illustrating the magnitude of outputs from each of a plurality of actuators in a system operating in accordance with the invention.

FIGS. 8*a* and 8*b* illustrate the performance of a multi-channel, normalized tonal adaptive control system based on compensated, back-projected adaptation to a smooth convex constraint surface S in which the p factor is chosen as 32, and the selected limit for the actuators is set at unity. In FIG. 8*a*, three curves 104, 106, 108 representing the convergence for the sum of squared error signals are provided with respect to time. Curve 104 represents convergence for gradient descent adaptation with uncompensated back-projection, where the step size $\mu$ was chosen such that the convergence rate was maximized. Curve 106 represents convergence for normalized adaptation with uncompensated back-projection. Note that curve 106 converges more quickly than curve 104, however, curve 106 converges at an elevated level, e.g. star 92 in FIGS. 4 and 5. Curve 108 represents convergence for normalized adaptation with compensated back-projection. Note that curve 108 converges as quickly as curve 106, however, continues to converge to a lower error signal value, e.g. star 94 in FIGS. 4 and 5. In FIG. 8*b*, the magnitude of outputs for each of the 8 actuators is plotted with respect to time. For the period of time from k=0 to $k=k_1$, the system is adapting and it is not necessary to limit any of the actuators. At time k=approximately $k_1$, it is necessary to limit two of the actuators. Note that limiting two of the actuators causes overall system adaptation to adjust trajectories as illustrated by the changes in actuator output for several of the actuators at time k=approximately $k_1$. Between time $k=k_1$ and $k=k_2$, the system is adapting along the limit surface for the two actuators. At time k=approximately $k_2$, it is necessary to limit a third actuator, thus again creating some readjustment in the trajectory of some of the other actuators.

Figure 9A:
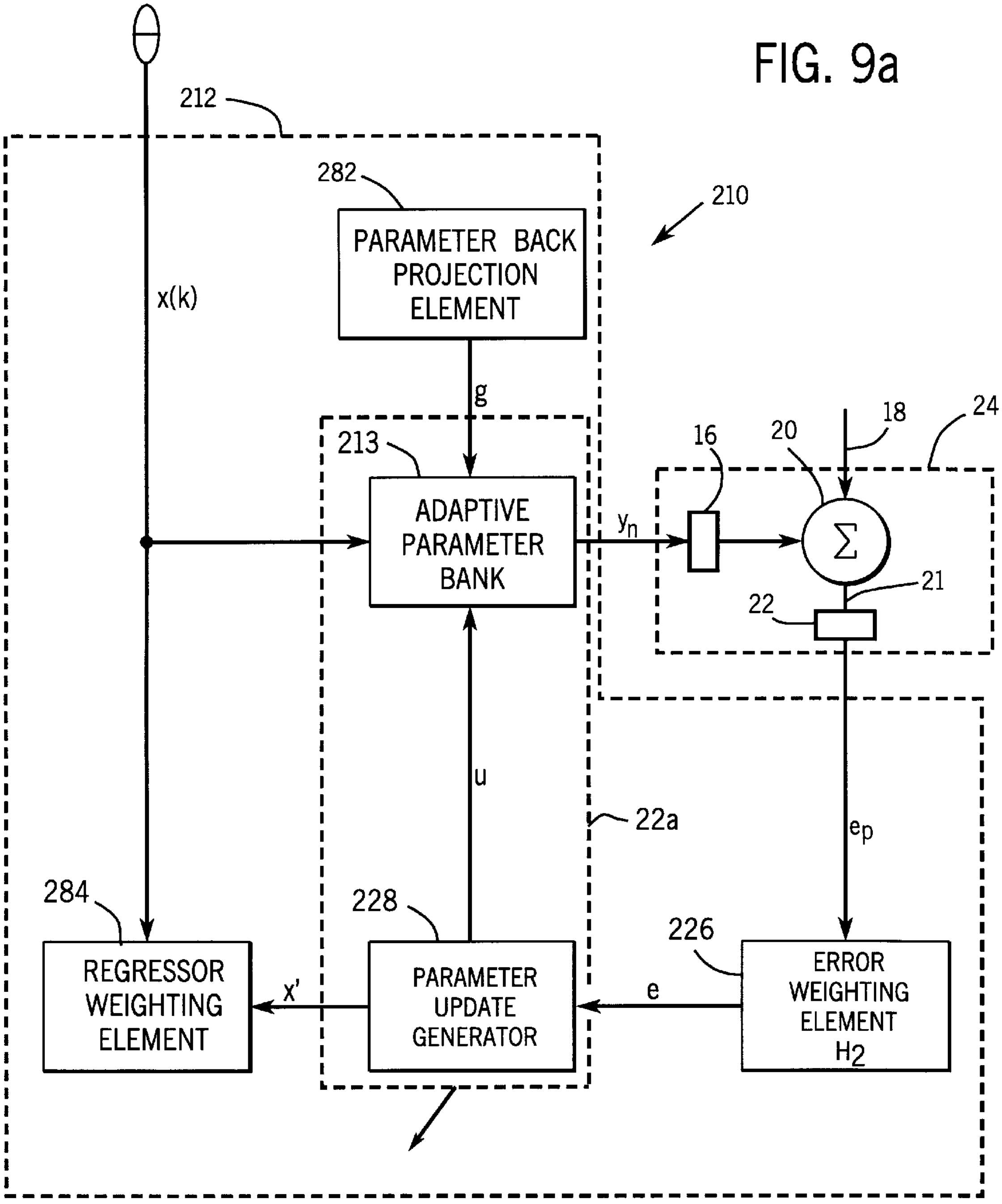
FIG. 9*a* is a schematic illustration of another embodiment of an active tonal attenuation system with back-projected adaptation to limit actuator output in accordance with the invention.

FIG. 9*a* illustrates another tonal embodiment of the invention including a regressor weighting element $H_3$, block 284. In many respects, the system shown in FIG. 9*a* is similar to the system shown in FIG. 3*a* and similar reference numerals are used where appropriate to facilitate understanding.

Referring to FIG. 9*a*, the system 210 includes an error weighting element $H_2$, block 226, and a regressor weighting element $H_3$, block 284. In order for the system 210 to be convergent, it is important that the weighting elements $H_2$ and $H_3$ be selected so that the eigenvalues of the product $H_3^H H_2 C$ have negative real part at the frequencies of interest. In order to account for delay or phase changes in the C path, the system 210 can be made more stable by providing delay or phase change by the regressor weighting element $H_3$, block 284. In such a system, $H_3$ is preferably set to a delay element of $k_d$ samples. That is, its frequency response is given by $H_3$ equals $Ie^{-j\omega(kd/fs)}$, where ω is the radian frequency response of the disturbance and $f_s$ is the sampling rate (number of samples per second) for the system 210. This delay or phase change term is useful for approximating the group delay or phase characteristics in the C path, and broadens the bandwidth of single frequency decompositions used in the C path model. Given the presence of the regressor weight element, the error weighting element is correspondingly set to $H_2=-BC^H e^{-j\omega(kd/fs)}$ in order to account for the phase shift imposed by the regressor weighting element.

As shown in FIG. 9*a*, error input signals e from the error weighting element $H_2$, block 226, input the parameter update generator 228, as well as filtered regressor signals x'(k) from the regressor weighting element $H_3$, block 284. The parameter update generator 228 outputs update signals u which are used by the adaptive parameter bank 213 to update adaptive parameters. As discussed with respect to FIG. 1*a*, the adaptive parameter bank 13 generates a plurality of n correction signals $y_n$. Each of the n correction signals $y_n$ drive the actuator 16 to provide cancelling secondary input 17 to the acoustic plant. When the system 210 is operating such that the n correction signals $y_n$ do not exceed selected limits, the system 210 preferably operates in accordance with C path null space constraint techniques as described in U.S. patent application Ser. No. 08/369,925 entitled "Adaptive Tonal Control System With Constrained Output And Adaptation", by Steven R. Popovich, now U.S. Pat. No. 5,633,795, issued on May 27, 1997. However, once it is determined that one of the correction signals $y_n$ will exceed a selected limit, parameter back-projection, as illustrated by block 282 on block 229, is desirable. The parameter back-projection element 282 shown in FIG. 9 is similar to the parameter back-projection element described with respect to FIG. 3*a* through FIG. 8.

Depending on the dimension of the systems 110 and 110*a* described with respect to FIG. 3*a* through FIG. 8, or the system 210 described with respect to FIG. 9*a*, matrix computations may become computationally burdensome, especially when the system is operating to attenuate several distinct frequencies. One way to lessen computational burdens created by matrix multiplications both while implementing C path null space constraint techniques and during parameter back-projection is to accumulate the update signals u for a number of sample periods (e.g. 10–100 sample periods), combine the accumulated update with the respective adaptive parameter in the adaptive parameter bank, and thereafter back-project the accumulated update to the constraint surface S, if necessary.

Figure 9B:
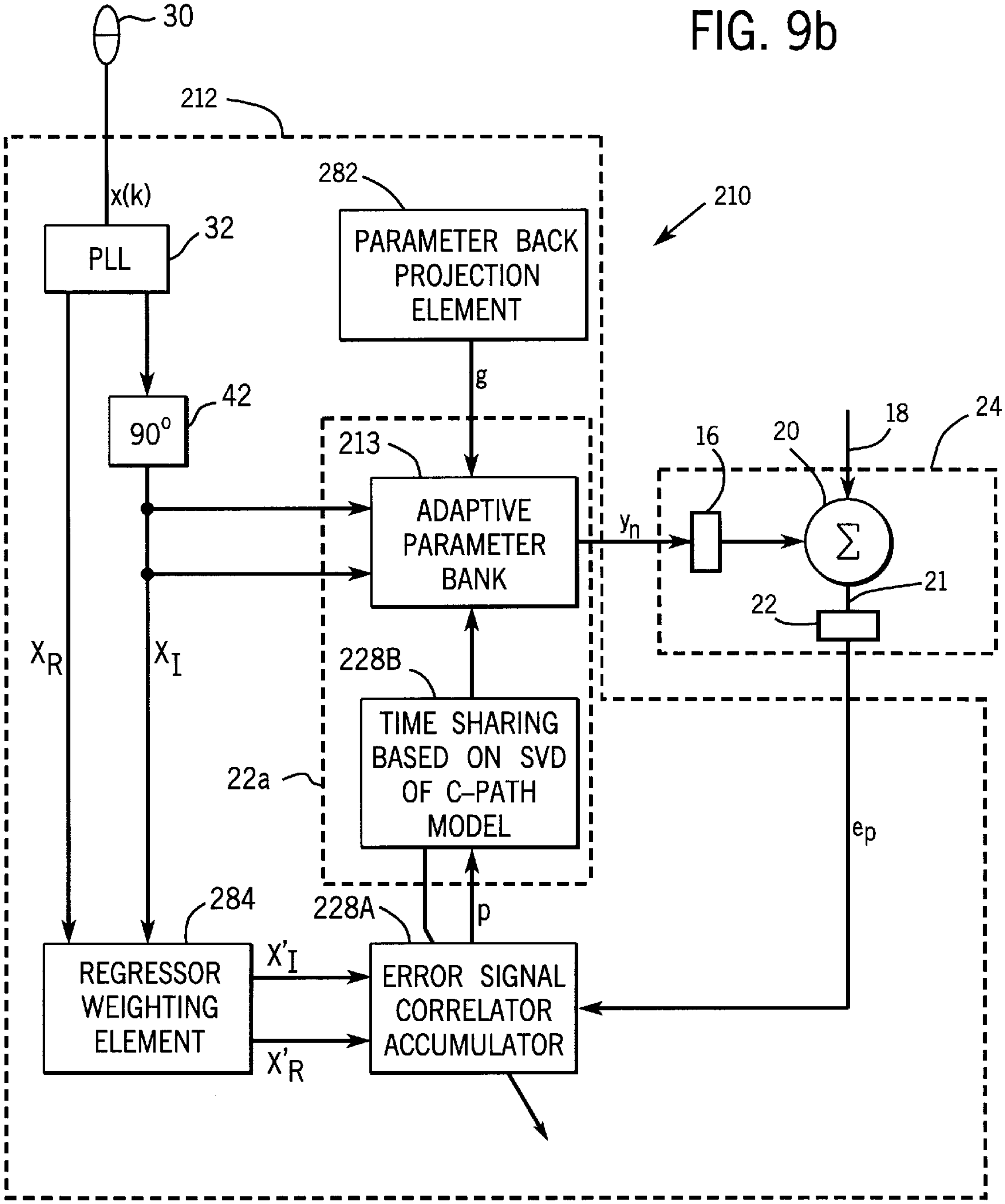
FIG. 9*b* is a schematic illustration of another embodiment of an active tonal attenuation system implementing a time-sharing technique.

Referring to FIG. 9*b*, a time-sharing technique can be used in which processing requirements are reduced by selectively adapting with respect to the principle components of the system. For the system in FIG. 9*b*, the parameter update generator 228 and the error weighting element 226 shown in previous Figures is replaced by the combination of an error signal correlator/accumulator 228A and a time-sharing module 228B. The error signal correlator/accumulator 228A can be used to accumulate information relating to the phase and amplitude of the error signal according to the following equation:

$$\rho(k+1)=\rho(k)+e_p(k)[\chi_R'(k-k_d)+jx_I'(k-k_d)] \quad (8A)$$

where ρ(k) is a pxl complex vector representation for the accumulated error update signal, $e_p(k)$ is a pxl vector of error signals from the error sensors 22, $x_R'(k-k_d)$ is a delayed version of the in-phase regressor signal and $x_I'(k-k_d)$ is a delayed version of the quadrature reference signal, all at time k. The respective components of the accumulated error update signal ρ(k) corresponding to columns of matrix $Ue^{-j\omega(kd/fs)}$ are determined in block 228B according to:

$$q_j = \tilde{U}_j^H \rho(k) \quad (9A)$$

where $q_j$ is the level of the component of $\tilde{U}_j$ present in the accumulated error update signal and $\tilde{U}_j$ denotes the $j^{th}$ column from matrix $Ue^{-j\omega(kd/fs)}$. The component $\tilde{U}_j$ is eliminated from the accumulated update signal in block 228A, in accordance with the following equation:

$$\rho_{new} = \rho_{old} - q_j \tilde{U}_j \quad (10A)$$

Since the columns of matrix U are orthogonal, they form a complete basis. Hence, as long as all components are periodically projected out of the accumulated error update signal, the accumulation represented by equation 8A remains bounded.

The update, and if necessary restraint, is then performed for each component $V_j$ corresponding to the respective $\tilde{U}_j$ and $q_j$. The component V is used to adapt the adaptive parameters in block 213 according to the following equation:

$$Y_{R,new} = Y_{R,old} + \bar{s}_j q_j Re\{V_j\} \text{ and } Y_{I,new} = Y_{I,old} + \bar{s}_j q_j Im\{V_j\} \quad (11A)$$

where $\bar{s}_j$ represents a normalization factor determined in accordance with the magnitude of the corresponding singular value from the decomposition of the C path model. If the adaptive parameters lie with the constraint surface S, the component $V_j$ is used to adapt the adaptive parameters in accordance with null space restraint techniques (i.e. the values for $\bar{s}_j$ corresponding to trivial or zero singular values are set to zero). If the adaptive parameters would substantially lie outside of the constraint surface S (i.e. substantially beyond the tangent plane) after adaptation, the component $V_j$ is used to adapt the adaptive parameters in accordance with the back-projection techniques, as described earlier. In particular, the adaptation is carried out according to:

$$Y_{R,new} = Y_{R,old} + \bar{s}_j q_j Re\{\bar{V}_j\} \text{ and } Y_{I,new} = Y_{I,old} + \bar{s}_j q_j Im\{\bar{V}_j\} \quad (12A)$$

where $\bar{V}_j$ is a back-projected version of $V_j$. These back-projected versions can be periodically updated as the adaptive parameters migrate along the constraint surface. Adaptation can occur with respect to any number of columns in V as long as each column in V is processed within a reasonable time frame. Such a time-sharing method reduces or eliminates the need for complete matrix multiplications, and thus allows for compensated and back-projected adaptation when using a DSP having conventional processing capabilities.

Broadband Control System

FIG. 10 shows an active adaptive attenuation system 310 as disclosed in issued U.S. Pat. No. 5,621,803 entitled "Active Attenuation System With On-Line Modeling of Feedback Path", to Trevor Laak, issued on Apr. 15, 1997 which is herein incorporated by reference and is assigned to the assignee of the present application. The system 310 includes an actuator 311 that outputs a secondary input that combines with a system input 312 to yield a system output 314. The system 310 shown in FIG. 10 is a feedforward system, and is capable of attenuating or shaping acoustic disturbances in the system input 312 that are not periodic. (The system 310 is also capable of attenuating or shaping tonal disturbances.) The system includes an input sensor 16, such as a microphone or accelerometer, which senses the system input 312 and generates an input signal that is transmitted from the sensor 316 through line 318. An error sensor 320 senses the system output 314 and generates an error signal which is transmitted through line 322. The system 310 uses an adapter controller 321, preferably embodied in a digital signal processor to drive the actuator 311. A first adaptive filter model 324, block A, in the adaptive controller 321 has a model input from line 319 derived from the input signal in line 318, an error input from line 321 derived from the error signal in line 322, and a model output which is a correction signal that is transmitted through line 326 to the actuator 311, as is known in the art.

The transfer function of the C path from the output of the A model 324 to the output of the error sensor 320 is modeled by another adaptive filter model 328, block C, preferably as disclosed in U.S. Pat. No. 4,677,676. The C model has a model input from an auxiliary random noise source 330, block N, which provides random noise uncorrelated with the system input 312. The output of C model 328 is subtracted at summer 332 from the error signal 322, and the resultant sum is multiplied at multiplier 334 with the input to the C model 328. The multiplier 334 outputs a weight update signal in line 335 for the C model 328. The random noise signal from source 330 is also summed at summer 336 with the correction signal from A model 324, and the resultant sum is transmitted to the actuator 311. A copy 338 of the C model receives input from line 319 which is the same input that inputs the first adaptive filter model 324, block A. The C model copy 338 outputs a filtered regressor signal which is transmitted through line 339 to adaptive parameter generator 340 (e.g. multiplier 340). The multiplier 340 multiplies the error signal from line 322 and the filtered regressor signal from line 339, and outputs an update signal in line 321 that is used to update the first adaptive filter model 324, block A.

A second adaptive filter model 342, block D, receives model input from the summer 336 through line 343, receives error input from multiplier 350 through line 351, and outputs a recursive signal in line 353 that is transmitted to summer 344. The recursive signal in line 353 is summed with the input signal in line 318 by summer 344 to generate the reference signal in line 319 which is supplied to the first adaptive filter model 324, block A. The error input signal for the D model 342 in line 351 is generated in multiplier 350 by multiplying the error signal in line 322 by a filtered correction signal in line 343. The correction signal in line 343 is filtered by a copy 346 of the A model 324, and a copy 348 of the C model 328 both in series. The purpose of the D model is to model the acoustic feedback path between the actuator 311 and the input sensor 316 on-line, and electrically remove the effect of acoustic feedback from the reference signal in line 319. Preferably, both the A model 324 and the D model 342 are FIR (finite impulse response) filters implemented in the time domain, and updated using a normalized gradient descent method such as the LMS (lease means square) or RLMS (recursive lease means square) techniques shown in FIG. 10.

FIG. 11 shows the adaptive control system 310 implementing a parameter back-projection element 352 to constrain adaptation in accordance with the invention. The purpose of the parameter back-projection element 352 is to constrain adaptation of adaptive parameters in the A model 324 so that no correction signal in line 326 exceeds a selected limit S. While the invention can be carried out in a system 310 implementing only an FIR A model without a recursive model such as a D model 342, or a B model as disclosed in U.S. Pat. No. 4,677,676, it is preferred that the system 310 implement a D model 342 to help maintain the statistics of the reference signal 319 stationary or nearly stationary. If reference signal statistics are nearly stationary, a fixed constraint surface S in the parameter space can be used, otherwise it may be desirable to select the constraint surface S in terms of reference signal statistics.

FIG. 12 illustrates a constraint surface 354, S, defined in the parameter space for the adaptive parameters in relation to an error performance contour map for two adaptive parameters $a_1$ and $a_2$. The optimum non-constrained solution is depicted by star 356. The optimum constrained solution is depicted by star 358 which is located on the constraint surface 354 at the location where the constraint surface 354 is tangent to one of the error contours for the performance map. The constraint surface 354 in the parameter space for the adaptive parameters is typically elliptical because the surface 354 will typically represent a constraint limit related to the means square value of current, voltage, or displacement for the actuator 311.

FIG. 13 is a graphical depiction of compensated, back-projected adaptation for the broadband system 310 shown in FIG. 11. In FIG. 13, vector $d_S$ is a vector normal to the constraint surface c(a). Vector $d_R$ is determined from $d_S$ via the transformation matrix B according to the relation $d_S=Bd_R$. The vector $u=[Cx]e\mu$ represents the unconstrained update signal vector using a gradient descent method. The vector ω=Bu represents a normalized update signal generated from the gradient descent vector via the transformation matrix B. Compensated back-projection is illustrated by vector $-gd_R$. The normalized update vector lying tangent to the plane is shown in FIG. 13 as vector $\bar{\chi}$, where it is given by the vector sum $\bar{\chi}=\chi-gd_R$. The value for g is determined such that this vector sum lies tangent to the plane, or equivalently, such that it is orthogonal to $d_S$. Continued adaptation as illustrated in FIG. 13 results in the system converging at the optimum constrained solution indicated by star 358 in FIG. 12.

The preferred manner of carrying out compensated, back-projected adaptation for a single input single output (SISO) broadband system 310 as shown in FIG. 11 is explained in mathematical terms as follows.

The transformation matrix B is preferably determined by taking the eigenvalue decomposition of the autocorrelation matrix:

$$R_{XcXc}=V\Lambda V^H \quad (1B)$$

where V is a square matrix, $V^H$ is the hermitian transpose of matrix V, and Λ is a matrix containing eigenvalues of the system along the diagonal. The off-diagonal elements of Λ are 0 while the diagonal elements are in general real and positive. The transformation matrix B is preferably calculated as $B=V\bar{\Lambda}V^H$, where $\bar{\Lambda}$ is determined by inverting non-trivial values on the diagonal of Λ down to an inversion limit defined in relation to the maximum eigenvalue.

The unconstrained update signal u in line 321, FIG. 11, before normalization is represented by $u=[Cx]\ e\mu$ where [Cx] is the filtered reference signal regressor, line 339, FIG. 11, e is the error signal in line 322, FIG. 11, and μ is a convergence step size. The normalized unconstrained update signal vector χ is given by χ=Bu.

The constraint surface S for a single input single output system 310 having a single constraint is defined as the set of all points satisfying:

$$c(a)=\frac{a^T R_{KK} a}{G}=1 \quad (2B)$$

where $R_{KK}$ is a non-identity covariance matrix for the term K(k) which represents the convolution between the reference signal x(k) and the transfer function H(k) of the path which translates the correction signal y(k) into a physical limit value relating to the physical limitations of the system; a is the tap weight vector for the first adaptive filter 324, block A (i.e. the adaptive parameters); and G represents the maximum allowable means-squared output (e.g. power) for the actuator 311. If applying the normalized, unconstrained update signal vector χ to the adaptive parameters, a, does not cause the adaptive parameters to lie outside of the constraint surface S, normalized adaptation proceeds unconstrained. However, if applying the normalized, unconstrained update signal vector χ to the adaptive parameters a results in adaptive parameters substantially outside of the constraint surface S, back-projection is used to adapt the adaptive parameters along the constraint surface S.

Back-projection is explained mathematically as follows. A vector $d_S$ which is normal to the constraint surface S at a point on S is determined by a scaled version of the gradient for the constraint function c(a) evaluated at that point, as represented by:

$$d_S=R_{KK}a. \quad (3B)$$

Transforming the vector $d_S$ by the transformation matrix B results in:

$$d_R=Bd_S. \quad (4B)$$

Given a normalized, unconstrained update vector χ=B u, a back-projection gain factor g (scaler) is defined by the following equation:

$$g=\frac{d_S^T u}{d_R^T d_S}. \quad (5B)$$

The normalized, constrained update signal vector χ is defined by the following vector equation:

$$\bar{\chi}=u-gd_R \quad (6B)$$

Applying the normalized, constrained update signal vector χ to the respective adaptive parameters a results in adaptation along the constraint surface S.

In some applications, it may be desirable to provide two or more separate constraints on the adaptive parameters contemporaneously. FIG. 15 illustrates an application involving two separate constraints. It is desirable to combine the constraint functions to provide a single smooth constraint surface for back-projection. In FIG. 15, a first constraint function 366 is illustrated in the parameter space of the adaptive parameters $a_0$ and $a_1$. A second constraint function 368 is also shown in the adaptive parameter space for the adaptive parameters $a_0$ and $a_1$. For purposes of illustration, the first constraint function can be represented by $c_1(a)=(a^T R_{KK,1}a)\div G_1=1$ and the second constraint function 368 can be defined as $c_2(a)=(a^T R_{KK,2}a)\div G_2=1$. In order that adaptation does not generate one or more adaptive parameters lying substantially outside of either of the constraint functions 366 or 368, a constraint surface 370 representing a combination of each individual constraint 366 and 368 is used to constrain adaptation. Note that the portions of the combined constraint surface 370 corresponding to the intersections 372 of the first and second constraint functions 366 and 368 should be smooth to ensure stability. In general, the constraint surface for a system having multiple constraints is preferably defined by the following equation:

$$c(a)=\sum_{m=1}^{M}\left(\frac{(a^H R_{KK,m}a)}{G_m}\right)^p \quad (2B')$$

In such a system, a vector $d_S$ normal to the constraint surface S is again defined by a scaled version of the gradient for the constraint function c(a) according to:

$$d_s=\sum_{m=1}^{M} G_m^{-p}(a^H R_{KK,m}a)^{p-1} R_{KK,m}a \quad (3B')$$

While the system 310 shown in FIG. 11 has been described thus far as a single input single output (SISO) system, it should be apparent to those skilled in the art that such a system could include multiple actuators 311 and multiple microphones 320 (i.e. a MIMO multiple input multiple output system). In a MIMO system, or even in some SISO systems, computational burdens created by matrix multiplications may render it desirable to accumulate unconstrained update signals $\chi$ for a number of sample periods (e.g. 10 to 100 sample periods), combine the accumulated update with the respective adaptive parameter in the adaptive parameter bank, and thereafter back-project the accumulated update to the constraint surface S, if necessary. Alternatively, it may be desirable to adapt via time-sharing among linearly independent coordinates of the system in a manner similar to the description of time-sharing for the tonal system 110, FIGS. 3*a* and 3*b*. In particular, updates are accumulated for each sampling period in accordance with the following equation:

$$\chi_{acc}(k+1)=\chi_{acc}(k)+x_c(k)e(k)\mu \tag{8B}$$

where $\chi_{acc}(k)$ is the accumulated update at time k, e(k) is the error signal in line 322, FIG. 11 at time k, $x_c(k)$ is the filtered regressor signal in line 339, FIG. 11, at time k, and $\mu$ is a convergence step size. The respective components q of the accumulated update signal $\chi_{acc}(k)$ corresponding to the respective columns of matrix V are given by:

$$q=V_i^H\chi(k) \tag{9B}$$

where q is the level of the accumulated update signal $\chi_{acc}(k)$ in the direction of $V_i$. The component q is then eliminated from the accumulated update signal $\chi_{acc}(k)$ in accordance with the following equation:

$$\chi(k+1)=\chi_{acc}(k)-qV_i \tag{10B}$$

Since the columns of matrix V form a complete basis, periodically projecting out respective components does not render the system unstable. The update is then performed for each component $V_i$ in accordance with the following expression:

$$A(k+1)=A(k)+\frac{q}{\Lambda_{ii}V_{i,constrained}} \tag{11B}$$

where $\Lambda_{ii}$ is the corresponding diagonal element in the $\Lambda$ matrix, and $V_{i,\ constrained}$ is the projection of the $i^{th}$ column of the V matrix onto the constraint surface S.

The invention has been described with respect to a few preferred embodiments of the invention. Various alternatives, modifications and equivalents may be apparent to those skilled in the art. The following claims should be interpreted to include such alternatives, modifications and equivalents.

I claim:

1. An adaptive tonal control system having a system input and a system output, the adaptive tonal control system comprising:

a plurality of actuators each receiving a correction signal and outputting a secondary input, the secondary input combining with the system input to yield the system output;

a plurality of error sensors sensing a system output, each error sensor generating an error signal; and an adaptive controller that outputs the correction signals, the controller including an adaptive parameter bank that outputs a plurality of output signals in accordance with the adaptive parameters, the output signals being used to generate the correction signals;

a parameter update generator that generates update signals in accordance with the error signals to adapt the adaptive parameters in the adaptive parameter bank; and a parameter back-projection element that directly limits adaptation of the adaptive parameters so that none of the correction signals drive the respective actuator beyond a constraint surface which is defined in the parameter space of the adaptive parameters.

2. An adaptive tonal control system as recited in claim 1 wherein a reference signal inputs the adaptive parameter bank and the constraint surface is defined in the parameter space of the adaptive parameters as a function of reference signal characteristics.

3. An adaptive tonal control system as recited in claim 1 wherein a reference signal inputs the adaptive parameter bank and the constraint surface is fixed in the parameter space for the adaptive parameters.

4. An adaptive tonal control system as recited in claim 1 wherein:

the parameter back-projection element generates back-projection signals which are combined with update signals so that adaptation of the adaptive parameters in the adaptive parameter bank are constrained in accordance with the constraint surface.

5. An adaptive tonal control system as recited in claim 1 further comprising:

a C model of a path between the output of the adaptive controller and the error sensors; and an error weighting element that inputs the error signals from the error sensors and weights the error signals to generate error input signals that are input to the parameter update generator, the error weighting element including a matrix representing $BC^H$, where B is a transformation matrix and $C^H$ is the hermitian transpose of a matrix C representing the C model.

6. An adaptive tonal control system as recited in claim 5 wherein B is an nxn transformation matrix defined by $B=V\overline{\Lambda}V^H$ where matrix V is determined in accordance with an eigenvalue decomposition of $C^HC$, V is an nxn unitary matrix, $V^H$ is the hermitian transpose of V, $\overline{\Lambda}$ is a real diagonal matrix containing the eigenvalues of $C^HC$, and $\overline{\Lambda}$ is formed by inverting non-trivial diagonal entries of $\Lambda$ down to an inversion limit defined in relation to the maximum eigenvalue.

7. An adaptive tonal control system as recited in claim 1 wherein the constraint surface is a smooth convex surface.

8. An adaptive tonal control system as recited in claim 1 in which the constraint surface is defined by actuator-specific output limitations.

9. An adaptive tonal control system as recited in claim 1 wherein the system includes n actuators, the adaptive parameters in the adaptive parameter bank include a set of in-phase scaling vectors $Y_{R,n}$ for the n actuators and a set of quadrature scaling vectors $Y_{I,n}$ for the n actuators, and the selected limit is defined by a constraint surface $C(Y_R, Y_I)$ such that:

$$c(Y_R, Y_I)=\sum_n\left[\frac{Y_{R,n}^2+Y_{I,n}^2}{G_n}\right]^p=\text{constant}$$

where $G_n$ is a gain factor for the $n^{th}$ actuator, and p is a multiple constraint approximation factor.

10. An adaptive tonal control system as recited in claim 1 wherein the system is a multi-tone adaptive control system, the system includes n actuators, the adaptive parameters in the adaptive parameter bank include a set of in-phase scaling vectors $Y_{R,n,t}$ for the n actuators at each respective tone t and a set of quadrature scaling vectors $Y_{I,n,t}$ for the n actuators at each respective tone t, and the selected limit is defined by a constraint surface $C(Y_R, Y_I)$ such that:

$$c(Y_R, Y_I) = \sum_n \left[ \frac{\sum_t (Y_{R,n,t}^2 + Y_{I,n,t}^2)}{G_n} \right]^p = \text{constant}$$

where $G_n$ is a gain factor for the $n^{th}$ actuator, and p is a multiple constraint approximation factor.

11. An adaptive tonal control system as recited in claim 1 further comprising a regressor weighting element that receives an input reference signal and outputs a filtered regressor signal that inputs the parameter update generator.

12. An adaptive tonal control system as recited in claim 11 wherein the adaptive controller further comprises:

a C model path between the output of adaptive controller and the error sensors; and wherein the error weighting element is represented by $H_2=-BC^He^{-j\omega(kd/fs)}$, and the regressor weighting element is represented by $H_3=Ie^{-j\omega(kd/fs)}$ where $\omega$ is the frequency of the tone of interest, $k_d$ is the amount of desired delay, $f_s$ is the system sampling rate, and transformation matrix $B=V\bar{\Lambda}V^H$ where matrix V is determined in accordance with an eigenvalue decomposition of $C^HC$, V is a unitary matrix, $B^H$ is the hermitian transpose of matrix V, $\Lambda$ is a real diagonal matrix containing the eigenvalues of $C^HC$, and $\bar{\Lambda}$ is formed by inverting non-trivial diagonal entries of $\Lambda$ down to an inversion limit defined in relation to the maximum eigenvalue.

13. An adaptive tonal control system as recited in claim 1 wherein adaptation is accomplished via time-sharing.

14. An adaptive tonal control system as recited in claim 13 wherein time-sharing is accomplished by accumulating parameter updates, extracting components of the accumulated updates in accordance with principal components of a C matrix modelling the speaker-error path, and performing respective updates in accordance with the respective component of the accumulated update.

15. An adaptive tonal control system as recited in claim 14 wherein:

the principal components extracted from the accumulated updates are defined by columns of U and the respective components added to the adaptive parameters are defined by the columns of matrix V, U and V being defined from singular value decomposition of the C matrix.

16. An adaptive tonal control system as recited in claim 15 wherein each respective update is constrained by calculating the respective update in accordance with a back-projected version of the respective column of matrix V.

17. In an adaptive control system having a system input and a system output, a method of controlling a tonal disturbance in the system output comprising the steps of:

filtering a reference signal through adaptive parameters to generate a plurality of correction signals;

driving a plurality of actuators in accordance with the correction signals to generate a plurality of secondary inputs that combine with the system input to yield the system output;

sensing the system output and generating a plurality of error signals in response thereto;

using the error signals to generate a unconstrained update signal vector that is intended to be used to adapt the adaptive parameters; and constraining adaptation of the adaptive parameters in relation to a smooth convex constraint surface surrounding a desired region in the parameter space of the adaptive parameters.

18. The method as recited in claim 17 wherein adaptation is constrained by back-projecting the update signal vector onto or near the constraint surface surrounding the desired region in the parameter space of the adaptive parameters when using the unconstrained update signal vector for adaptation would cause one or more adaptive parameters to lie outside of the desired region.

19. The method as recited in claim 17 wherein the constraint surface of the desired region is defined in the parameter space of the adaptive parameters as a function of reference signal characteristics.

20. The method as recited in claim 17 wherein the constraint surface of the desired region is fixed in the parameter space of the adaptive parameter.

21. The method as recited in claim 17 wherein:

the unconstrained update vector is generated using the error signals in accordance with a gradient descent method to reduce a cost function; and adaptation is constrained by vector summing a back-projection vector with the unconstrained update signal vector so that none of the adaptive parameters lie substantially outside of the constraint surface in the parameter space.

22. The method as recited in claim 21 wherein the back-projection vector is orthogonal to the constraint surface in the parameter space.

23. The method as recited in claim 21 wherein the combination of the back-projection vector with the unconstrained update signal vector results in adaptation along a plane that is tangent to the constraint surface at the point which unconstrained adaptation would traverse the constraint surface.

24. The method as recited in claim 21 further comprising the steps of:

compensating the unconstrained update signal vector to normalize adaptation; and compensating the back-projection vector to account for the compensation of the unconstrained update signal vector; and wherein vector summing of the back-projection vector with the unconstrained update signal vector is accomplished by vector summing the compensated back-projection vector to the compensated unconstrained update signal vector.

25. The method as recited in claim 24 wherein the unconstrained update signal vector is compensated by transforming the unconstrained update vector by transformation matrix B, and the back-projection vector is compensated by transforming the back-projection vector by the same transformation matrix B and scaling so that the constrained update signal vector does not lie substantially outside of the constraint surface.

26. The method as recited in claim 25 wherein the transformation matrix B is a positive semi-definite matrix.

27. The method as recited in claim 17 wherein the smooth convex surface is defined by the following equation:

$$c(Y_R, Y_I) = \sum_n \left[\frac{Y_{R,n}^2 + Y_{I,n}^2}{G_n}\right]^p = \text{constant}$$

where $Y_{R,n}$ represents the in-phase scaling vector for the $n^{th}$ actuator, $Y_{I,n}$ represents the quadrature scaling vectors for the $n^{th}$ actuator, p is a multiple constraint approximation factor, and $G_n$ is a gain factor for the $n^{th}$ actuator.

28. The method as recited in claim 17 wherein a plurality of t tonal disturbances are controlled by the method wherein the smooth convex surface is defined by the following equation:

$$c(Y_R, Y_I) = \sum_n \left[\frac{\sum_t (Y_{R,n,t}^2 + Y_{I,n,t}^2)}{G_n}\right]^p = \text{constant}$$

where n represents the number of actuators, t represents the number of tones being cancelled, $Y_{R,n,t}$ represents the in-phase scaling vector for the $n^{th}$ actuator for the respective tone t, $Y_{I,n,t}$ represents the quadrature scaling vector for the $n^{th}$ actuator for the respective tone t, p is a multiple constraint approximation factor, and $G_n$ is a gain factor for the $n^{th}$ actuator.

29. A method as recited in claim 17 wherein:

the unconstrained update signal vectors are accumulated over a plurality of sample periods; and constrained adaptation of the adaptive parameters is accomplished via a time-sharing procedure in which orthogonal components of the accumulated update signal vectors are extracted individually from the accumulated update signal vector and the respective orthogonal component after being back-projected is used for constrained adaptation of the adaptive parameters.

30. In an adaptive control system having a system input and a system output, a method of attenuating a disturbance comprising the steps of:

filtering a reference signal through adaptive parameters to generate a correction signal;

driving an actuator in accordance with the correction signal to generate a secondary output which is combined with a secondary input to yield the system output;

sensing the system output and generating an error signal in response thereto;

using an error signal to generate a pre-constrained update signal vector that is intended to be used to adapt the adaptive parameter; and constraining the adaptive parameters to lie within a constraint surface defined by the following expression:

$$c(a) = \frac{a^H R_{KK} a}{G} = \text{constant}$$

where $R_{KK}$ is a non-identity covariance matrix for K(k) which represents the convolution between the reference signal and the transfer function H(k) of the path which translates the correction signal into a physical limit value relating to physical limitations of the system, a represents the adaptive parameters, and G represents the maximum allowable gain for the actuator.

31. A method as recited in claim 29, wherein the transfer function H(k) is equal to 1.

32. A method as recited in claim 30 wherein the transfer function H(k) is equal to 1.

33. A method as recited in claim 30 wherein the physical limit value represents the maximum allowable value of means-squared voltage applied to the actuator.

34. A method as recited in claim 30 wherein the physical limit value relates to the maximum allowable value of means-squared current applied to the actuator.

35. A method as recited in claim 30 wherein the physical limit value represents the maximum allowable value of means-squared displacement for an output element of the actuator.

36. In an adaptive control system having a system input and a system output, a method of attenuating a disturbance comprising the steps of:

filtering a reference signal through adaptive parameters to generate a correction signal;

driving an actuator in accordance with the correction signal to generate a secondary output which is combined with the system input to yield the system output;

sensing the system output and generating an error signal in response thereto;

using the error signal to generate an unconstrained update signal vector that is intended to be used to adapt the adaptive parameters; and constraining adaptation of the adaptive parameters to lie within or near a smooth convex constraint surface surrounding a desired region in the parameter space of the adaptive parameter satisfying two or more physical limitations of the system.

37. A method as recited in claim 36 wherein one of the physical limitations of the system relates to maximum displacement of an output element of the actuator.

38. A method as recited in claim 36 wherein one of the physical limitations of the system relates to voltage applied to the actuator.

39. A method as recited in claim 36 wherein one of the physical limitations of the system relates to current applied to the actuator.

40. A method as recited in claim 36 wherein the adaptive parameters are used to generate a plurality of correction signals, the plurality of correction signals drive a plurality of actuators each generating a secondary input that combines with the system input to yield the system output, and the system output is sensed to generate a plurality of error signals each being used in turn to generate one of a plurality of unconstrained update signal vectors each intended to be used to adapt the adaptive parameters.

41. A method as recited in claim 36 wherein the smooth convex constraint surface is defined by the following expression:

$$c(a) = \sum_{m=1}^{M} \left(\frac{(a^H R_{KK,m} a)}{G_m}\right)^p \tag{2B'}$$

where m is the number of physical limitations on the system, $R_{KK,m}$ is a non-identity covariance matrix for the term K(k) which represents a convolution between each respective reference signal and the transfer function H(k) of the path which translates the respective correction signal into a physical limit value relating to the physical limitations of the system, $\alpha$ represents the respective adaptive parameter, and $G_m$ represents the maximum allowable gain for the $m^{th}$ actuator.

42. A method as recited in claim 36 wherein constrained adaptation is accomplished by back-projecting the unconstrained update signal vector in relation to the constraint surface surrounding the desired region in the parameter space of the adaptive parameters when using the unconstrained update signal vector causes the adaptive parameters to lie outside of the desired region in the parameter space of the adaptive parameters.

43. A method as recited in claim 36 wherein adaptation of the adaptive parameters is constrained intermittently.

44. A method as recited in claim 36 wherein a plurality of unconstrained update signal vectors are combined for adaptation prior to constraining adaptation for the respective adaptive parameter so that the adaptive parameter does not lie substantially outside of the desired region in the parameter space.

45. A method as recited in claim 42 wherein back-projecting the unconstrained update signal vector is accomplished by back-projecting the unconstrained update signal vector to a plane that is tangent to the constraint surface at a point in which unconstrained adaptation would traverse the constraint surface.

46. A method as recited in claim 36 wherein:

the unconstrained update signal vector generated using the error signal is generated in accordance with a gradient descent method to reduce the cost function; and adaptation is constrained by vector summing a back-projection vector with the unconstrained update signal vector so that none of the adaptive parameters lie substantially outside of the smooth convex surface in the parameter space.

47. The method as recited in claim 46 further comprising the steps of:

compensating the unconstrained update signal vector to normalize adaptation; and compensating the back-projection vector to account for the compensation of the unconstrained update signal vector; and wherein vector summing of the back-projection vector with the unconstrained update signal vector is accomplished by vector summing the compensated back-projection vector to the compensated unconstrained update signal vector.

48. A method as recited in claim 47 wherein the unconstrained update signal vector is compensated by transforming the unconstrained update vector in accordance with transformation matrix B, and the back-projection vector is compensated by transforming the back-projection vector by the same transformation matrix B and scaling so that the constrained update signal vector does not lie substantially outside of the constraint surface.

49. A method as recited in claim 48 wherein the transformation matrix B is positive and semi-definite.

50. A method as recited in claim 42 wherein:

the unconstrained update signal vectors are accumulated over a plurality of sample periods; and constrained adaptation of the adaptive parameters is accomplished via a time-sharing procedure in which linearly independent components of the accumulated update signal vectors are extracted individually from the accumulated update signal vector and the respective linearly independent component after being back-projected is used for constrained adaptation of the adaptive parameters.

51. A method as recited in claim 50 wherein the linearly independent components are orthogonal components.

52. In an adaptive control system capable of attenuating non-repetitive acoustic disturbances and having a system input and a system output, a method of attenuating a non-repetitive acoustic disturbance comprising the steps of:

filtering a reference signal through adaptive parameters to generate a plurality of correction signals;

driving a plurality of actuators in accordance with the correction signals to generate a plurality of secondary inputs that combine with the system input to yield the system output;

sensing the system output and generating a plurality of error signals in response thereto;

using the error signals to generate an unconstrained update signal vector that is intended to be used to adapt the adaptive parameters; and constraining adaptation of the adaptive parameters to lie substantially within or near a desired region in the parameter space of the adaptive parameters enclosed by a smooth surface characterizing physical limitations of the system, said smooth surface being an approximation of at least two independent and intersecting constraint surfaces in which an intersection between the constraint surfaces is rounded in order to facilitate constrained adaptation at or near the intersection.

53. A method as recited in claim 52 wherein adaptation of the adaptive parameters is constrained intermittently.

54. A method as recited in claim 52 wherein a plurality of unconstrained update signal vectors are combined for adaptation prior to constraining adaptation for the respective adaptive parameter so that the adaptive parameter does not lie substantially outside of the desired region in the parameter space.

55. An active acoustic attenuation system for attenuating a non-repetitive acoustic disturbance, the system comprising:

an adaptive filter model including a set of adaptive parameters, the adaptive filter model inputting a reference signal and outputting a correcting signal;

an actuator that inputs the correction signal and outputs a secondary input that combines with the acoustic disturbance to attenuate or shape the acoustic disturbance;

an error sensor that senses system performance and generates an error signal in response thereto, the error signal being used to adapt the adaptive parameters in the adaptive filter model;

wherein adaptation of the adaptive parameters is constrained so that the adaptive parameters lie substantially within or near a desired region in the parameter space of the adaptive parameters enclosed by a surface in the parameter space characterizing one or more physical limitations of the system;

wherein constrained adaptation is accomplished by back-projection means, said back-projection means constraining adaptation of the adaptive parameters when unconstrained adaptation causes one or more of the adaptive parameters to lie outside of the desired region in the parameter space of the adaptive parameters; and a plurality of adaptive parameter update signal vectors are combined prior to back-projection to or near a constraint surface surrounding the desired region in the parameter space of the adaptive parameters.

56. A system as recited in claim 55 wherein the adaptive filter model is an FIR filter.

57. A system as recited in claim 55 wherein the adaptive filter model is a recursive IIR filter.

58. A system as recited in claim 55 wherein the recited adaptive filter model is a first adaptive filter model and the system further comprises a second adaptive filter model including a set of adaptive parameters, the second adaptive filter model inputting the correction signal and outputting a recursive signal that is combined with a system input signal to generate the reference signal that inputs the first adaptive filter model.

59. A system as recited in claim 58 further comprising compensation means for compensating the unconstrained update signal vector to accomplish normalized adaptation and back-projection.

60. A system as recited in claim 55 wherein adaptation of the adaptive parameters is constrained intermittently.

61. A system as recited in claim 55 wherein the system comprises a plurality of actuators and a plurality of error sensors, and the adaptive filter model includes a plurality of adaptive filter channels each generating a correction signal for a respective actuator.

62. A method of adaptive control comprising the steps of:

filtering a reference signal through adaptive parameters to generate a correction signal;

driving an actuator in accordance with the correction signal to generate a secondary input that combines with a system input to yield a system output;

sensing the system output and generating an error signal in response thereto;

using the error signal to generate an unconstrained update signal vector that is intended to be used to adapt the adaptive parameters;

constraining adaptation in accordance with physical limitations of the system by back-projection of the unconstrained update signal vector onto a plane calculated to lie tangent to a surface surrounding a desired region in the parameter space of the adaptive parameters; and periodically scaling the adaptive parameters to account for curvature of the surface surrounding the desired region so that adaptive parameters do not lie outside of the desired region.

63. A method as recited in claim 62 further comprising the step of:

periodically correcting the orientation of the plane due to migration along the surface surrounding the desired region in the parameter space of the adaptive parameters.

* * * * *